Oct. 13, 1964 E. D. RAPISARDA ETAL 3,152,754

PRINTER UNIT PARTICULARLY ADAPTED FOR USE IN A SYSTEM DISPENSING METERED AMOUNTS OF LIQUID

Filed Oct. 2, 1961 15 Sheets-Sheet 1

INVENTORS
EDWARD D. RAPISARDA
ANGELO LACIVITA
BY Chapin + Neal
Attorneys

INVENTORS
EDWARD D. RAPISARDA
ANGELO LACIVITA
BY Chapin & Neal
Attorneys

INVENTORS
EDWARD D. RAPISARDA
ANGELO LACIVITA
BY Clapin & Neal
attorneys

INVENTORS
EDWARD D. RAPISARDA
ANGELO LACIVITA
BY Chapin & Neal
attorneys

INVENTORS
EDWARD D. RAPISARDA
ANGELO LACIVITA
BY Chapin & Neal
Attorneys

INVENTORS
EDWARD D. RAPISARDA
ANGELO LACIVITA
BY Chapin + Neal
Attorneys

PRINTER UNIT PARTICULARLY ADAPTED FOR USE IN A SYSTEM DISPENSING METERED AMOUNTS OF LIQUID

Filed Oct. 2, 1961 15 Sheets-Sheet 7

INVENTORS
EDWARD D. RAPISARDA
ANGELO LACIVITA
BY Chapin + Neal
Attorneys

INVENTORS
EDWARD D. RAPISARDA
ANGELO LACIVITA
BY Chapin + Neal
attorneys

INVENTORS
EDWARD D. RAPISARDA
ANGELO LACIVITA
BY Chapin + Neal
Attorneys

INVENTORS
EDWARD D. RAPISARDA
ANGELO LACIVITA
BY Chapin + Neal
Attorneys

INVENTORS
EDWARD D. RAPISARDA
ANGELO LACIVITA
BY Chapin + Neal
attorneys

INVENTORS
EDWARD D. RAPISARDA
ANGELO LACIVITA
BY Chapin + Neal
attorneys

Oct. 13, 1964 E. D. RAPISARDA ETAL 3,152,754

PRINTER UNIT PARTICULARLY ADAPTED FOR USE IN A SYSTEM DISPENSING METERED AMOUNTS OF LIQUID

Filed Oct. 2, 1961 15 Sheets-Sheet 14

INVENTORS
EDWARD D. RAPISARDA
ANGELO LACIVITA
BY Chapin & Neal
Attorneys

United States Patent Office 3,152,754
Patented Oct. 13, 1964

3,152,754

PRINTER UNIT PARTICULARLY ADAPTED FOR USE IN A SYSTEM DISPENSING METERED AMOUNTS OF LIQUID

Edward D. Rapisarda, West Springfield, and Angelo M. Lacivita, Springfield, Mass., assignors to Gilbert & Barker Manufacturing Company, West Springfield, Mass., a corporation of Massachusetts Filed Oct. 2, 1961, Ser. No. 142,345
3 Claims. (Cl. 235—58)

The present invention relates to improvements in printing devices, and more particularly to improvements in printing devices of the type intended for use with a commodity delivering apparatus to record the amount and cost of a delivery.

For illustrative purposes reference will herein be made to liquid dispensing apparatus as would be used for the delivery of fuel oil to a retail purchaser. Such reference is not to be taken as a limitation on the use of the device disclosed since it would have utility in the delivery of gasoline or other commodities.

An object of the invention is to provide a maximum of information on a printed line of minimum length.

Another and ancillary object is to obtain a minimum spacing between a series of adjacent printing wheels wherein the wheel at one end is rotated in response to the delivery of fuel oil and the remaining wheels are incrementally rotated in response to each complete revolution of the adjacent printing wheel adjacent said one end.

Another object is to attain the above ends in a simple and effective manner which permits a "zero" reading to be printed on a ticket and then the ticket retained until after a "final" reading has been printed thereon upon completion of a delivery of fuel oil.

A further object is to provide improved means for "zeroing" the printing wheels after each delivery.

Yet another object of the invention is to impose a fixed sequence of operation which will minimize, if not eliminate, the possibility of fraud on the part of the person making a delivery of fuel oil.

Still another object of the invention is to provide a printing device capable of recording not only the amount and cost of a delivery, but optionally to record the amount of tax, if any, on the delivery and further to record the total cost to the purchaser.

The above and other related objects as well as the novel features of the invention will be apparent from a reading of the following description of the disclosure found in the accompanying drawings and the novelty thereof pointed out in the appended claims.

Figures 1, 2:
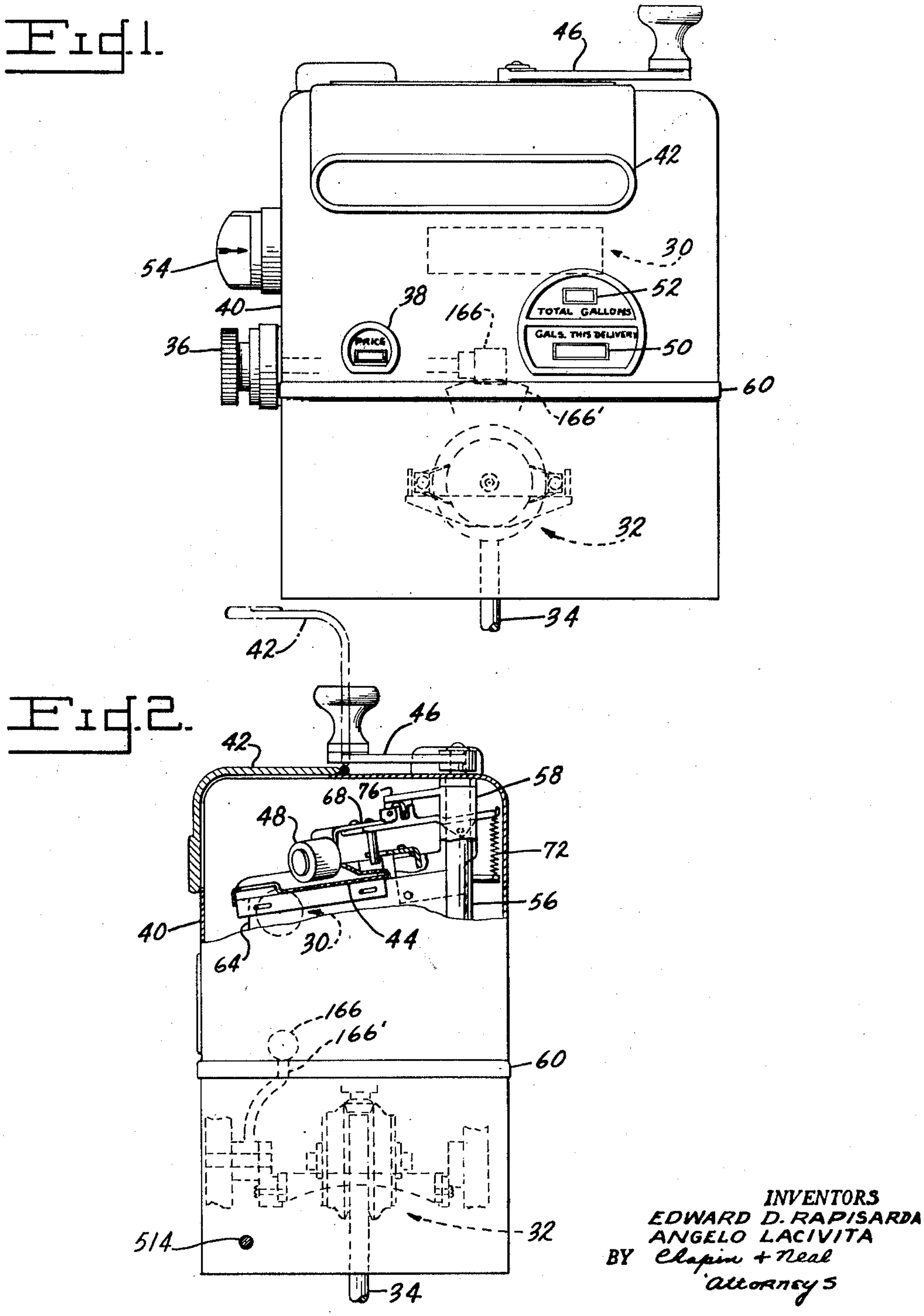
FIG. 1 is a front elevation of a printing device embodying the present invention.
FIG. 2 is an end elevation thereof with portions broken away and in section.

The printer unit of the present invention is adapted for use in the retail delivery of fuel oil and would be mounted on the usual tank truck employed in making such deliveries. The printer unit comprises a series of type wheels indicated generally at 30 in FIGS. 1 and 2. The wheels 30 are drivingly connected to a variator 32 which is preferably mounted immediately beneath or adjacent the printing unit. The input for the variator is provided by a shaft 34 which is drivingly connected to a meter (not shown in FIGS. 1 and 2) for measuring the amount of fuel oil being delivered.

Actually there are several driving connections to the wheels 30 so that different wheels will respectively indicate: (*a*) the volume of fuel delivered; (*b*) the price per gallon; (*c*) the cost of the fuel delivered; (*d*) the amount of tax on the fuel and (*e*) the total cost ($c+d$) of each delivery.

A knob 36 is mounted on one side of the printing unit to adjust the rate of computation of the variator 32 in accordance with the price per gallon to be established for the fuel. The variator itself is preferably constructed in accordance with the teachings of my copending application Serial No. 850,896, filed November 4, 1959. Rotation of the knob 36 further adjusts certain of the wheels 30 to print this price per gallon, which price is also indicated by a counter 38, visible through an opening in the outer casing 40 of the printer.

Figure 27:
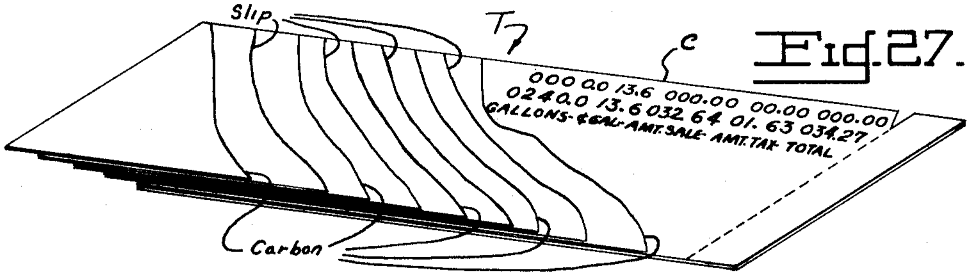
FIG. 27 is a perspective view of a receipt ticket used with the present printer, portions of which have successively been broken away.

Initially, a cover 42 is raised (to the indicated phantom position) and a ticket T placed in a carrier 44 above the wheels 30. The cover 42 is then closed and an operating lever 46 rotated towards the left. This movement of the operating lever causes a roller 48 to print on the card a zero reading, viz, the top line seen on the ticket T in FIG. 27. All the wheels 30, except those indicating price per gallon print a zero on the card. The printer is now ready for a delivery of fuel oil. At this time the operating lever 46 overlies (see phantom position in FIG. 3) the cover 42 to prevent removal or insertion of the ticket until the printing lever has been returned to its start position.

When the delivery of fuel oil is completed, the operation lever is swung in the opposite direction causing the wheels 30 to print a second impression on the card, indicating the amount and cost of fuel delivered. During each delivery, the volume of fuel delivered is shown by a counter 50, while the cumulative volume is shown by a counter 52, both counters being visible through openings in the casing 40. After each delivery and following the return of the operating handle to its start position, a reset knob 54 must be operated to return the appropriate type wheels 30 to their zero positions before a second delivery of fuel can be made.

*Printing of Zero and Final Readings*

The operating lever 46 is mounted at the upper end of a shaft 56 (FIGS. 3, 4 and 5) which is journaled in an inverted U-shaped bracket 58 and journaled at its lower end in a frame plate 60. The plate 60 has integrally cast walls 62, 63 which support parallel, spaced plates 64, 65 respectively. The U-shaped bracket 58 is in turn supported on the plates 64 and secured thereto by screws 66.

The print roller 48 (FIGS. 3 and 5) is mounted at the end of an arm 68 which is pivotally mounted on the shaft 56 by means of a pin 70. The arm 68 thus rotates with the shaft 56 but is free to swing in a vertical direction. A spring 72 extends between a pin 74 on shaft 56 and a finger from arm 68 to urge the print roller 48 upwardly at all times. An arcuate cam 76 projects from the bracket 58 in cooperative relation with a roller 78 mounted on the upper surface of the arm 68 to control the vertical position of the roller 48. At its "start" and "delivery" positions the roller 48 is spaced above the type wheels 30 by the spring 72. Intermediate these positions the cam 76 forces the print roller 48 downwardly to press the ticket against the wheels 30 as the roller passes thereover to thereby obtain a clear impression on the ticket T.

The carrier 44 (FIGS. 3 and 5) comprises downturned flanges 82 which rest on screws 84 threaded into the plates 64, 65. The screws 84 pass through slots in the flanges 82 and springs 86 extend from the rear screws 84 and to tabs on the flanges 82 to urge the carrier rearwardly. Movement of the carrier is controlled by a cam plate 88 which rests on bracket 58 with screws 90 threaded therein and passing through slots in the cam plate. The carrier 44 has a cam piece 92 fastened to its rear side in cooperative relation to a pin 94 which projects downwardly from the plate 88. The plate 88 also has two opposed edges 96, 98 which are in obstructive relation with a pin 100 depending from arm 68.

With a ticket positioned in the carrier 44 by locating surfaces 68, 70 thereon, the operating lever is swung toward its delivery position. After the roller 48 has passed over all the wheels 30 and has been raised above the carrier, the pin 100 engages the edge 96 (see phantom positions in FIG. 3) and shifts the cam plate 88 to the left. As the plate 88 is so shifted, the pin 94 engages the campiece 92 and shifts the carrier forwardly. When the lever 46 is swung back to its start position, the carrier remains in its shifted position until the roller 48 passes over all the wheels 30 to print a second impression (final print) on the ticket, spaced from the first impression. The pin 100 then engages the edge 98 and shifts the plate 98 to the right back to its original position whereupon the pin 94 is carried past the campiece 92 so that the springs 86 will return the carrier to its original position preparatory to the next cycle of operation.

*Drive for Volume Indicating Type Wheels and Counters*

There are five volume type wheels 30*v* (FIG. 3) capable of indicating the delivery of up to 9999.9 gallons of fuel. The drive for these wheels is conveniently taken from the gallons shaft 102 (FIGS. 4 and 7) of the variator 32. The gallon shafts 102 is journaled within the tubular money shaft 103 of the variator, which in turn is journaled in the frame plate 60. The upper end of shaft 102 is journaled in a projection 104 from an upstanding post 105 which is an integral part of the frame plate 60. A bevel gear 106 is secured to the shaft 102 and meshes with a second bevel gear 108 secured to a shaft 110. The shaft 110 is journaled in the post 105 and also in the plate 64. A spur gear 112 (see also FIG. 9) is mounted on the hub of the gear 108 with a one-way overriding clutch 111 providing a drive connection therebetween. The gear 112 is mounted on a clutch cage 114 with rollers 116 spring urged to transmit rotation to the gear 112 when the gear 108 and shaft 110 are rotating in a clockwise direction. This will allow the gear 112 to rotate in a counterclockwise direction while the gear 108 remains stationary during reset as will later become apparent.

The gear 112 meshes with a gear 118 which is rotatably mounted on a reset shaft 120. The reset shaft 120 is journaled on the plates 64, 65 (FIG. 4), with the reset knob 54 (FIG. 1) being secured to its outer end. The gear 118 (FIGS. 7 and 9) meshes with an idler gear 122 which is rotatably mounted on an idler shaft 124. The idler shaft 124 is mounted on the plates 64, 65. The idler gear 122 meshes with a gear 126 pinned to the fractions type wheel 30*v* which is rotatably mounted on a shaft 127. All the remaining type wheels 30 are likewise rotatably mounted on the shaft 127 which is mounted at its opposite ends on the plates 64, 65. A series of dots 128 are provided to the left (as viewed from the front, see FIG. 3) of each numeral on the fractions wheel 30*v* to provide the necessary decimal point in printing the volume of fuel delivered.

The drive for the remaining print wheels 30*v* comprises a series of gears 130 (FIGS. 7 and 8) rotatably mounted on the reset shaft 120. The gears 118 and 130 each comprises a sandwich formed by a locking disc 129 and a two-toothed disc 131 which are pinned together on a hub 133. A series of Geneva gears 135 are rotatably mounted on a shaft 137 which extends between the plates 64, 65 and is mounted in a manner later described in detail. Each Geneva gear 135 spans the discs 129 and 131 of one gear, and the next adjacent gear 130. The locking discs 129 have notches 139 which permits limited rotation of the Geneva gears 135 upon each full revolution of the gears 118 and 130. The number of teeth on the various gears are such that each gear 130 will be rotated $1/10$ of a revolution for each full revolution of the next adjacent gear towards the fractional drive gear 118. Each gear 130 meshes with an idler gear 132 (FIGS. 7 and 8) rotatably mounted on idler shaft 124. Each idler gear 132 in turn meshes with a gear 134 which is pinned to one of the remaining type wheels 30*v*. It is obvious that the discs 129 and 131 could be dispensed with on the gear 130 driving the highest order wheel 30*v*. The type wheels 30*v* are successively and incrementally rotated from the lowest order upward through the driving gears 130 and Geneva gears 135 with the exception of the lowest order or fractions type wheel which is continuously rotated by the gear 118 in response to rotation of the gallons shaft 102. With the described arrangement the print wheels 30*v* are closely spaced so that a maximum number of impressions may be printed along a line of minimum length with the impressions individually having a maximum size for good legibility.

The gallons shaft 102 (FIGS. 6 and 9) is also drivingly connected to the counters 50 and 52 (FIG. 1) through the means now to be described. A spiral gear 153 is pinned to the shaft 102 and meshes with a corresponding spiral gear 155 pinned to a shaft 157. The shaft 157 is journaled at one end in a post 159 (see also FIGS. 4 and 5). The front end of the shaft 157 is journaled in an upstanding plate 161 formed integrally with the frame plate 60 adjacent the front thereof. A bevel gear 163 (FIG. 9) is secured to the front end of the shaft 157 and meshes with a bevel gear 165. A spur gear 167 is secured to the same shaft as the gear 165 and meshes with a gear 169 secured to the end of the shaft 171 for the counter 50. The counter 50 is thus rotated to give a visible indication at the printer unit of the volume of fuel oil in each delivery. Means later described are provided for zeroing the counter 50 prior to each subsequent delivery.

The gear 167 also meshes with a gear 173 which is secured to a gear 175. The gear 175 meshes with a gear 177 which is secured to a gear 179. The gear 179 meshes with a gear 181 secured to the shaft 183 of the counter 52. The gear train from the gear 167 to the gear 181 provides a 10-to-1 reduction in the rate of driving the counter 52. Counter 52 thus gives a visible indication of the amount of oil delivered in even gallons, rather than tenths of a gallon, as in the case of the counter 50. The counter 52 is a cumulative counter and is not reset. The counter 52 is mounted on a bracket 185 formed at the upper end of the frame plate 161, while the counter 50 is mounted on the plate 161 itself (see also FIG. 5). The shafts for the gears forming the train including gears 167, 173 and 177, are rotatably mounted on an upstanding angle plate 187 which is secured to the frame plate 60 by screws 189.

*Drive for Price Indicating Type Wheels and Counter and for Adjusting the Variator*

Figure 10:
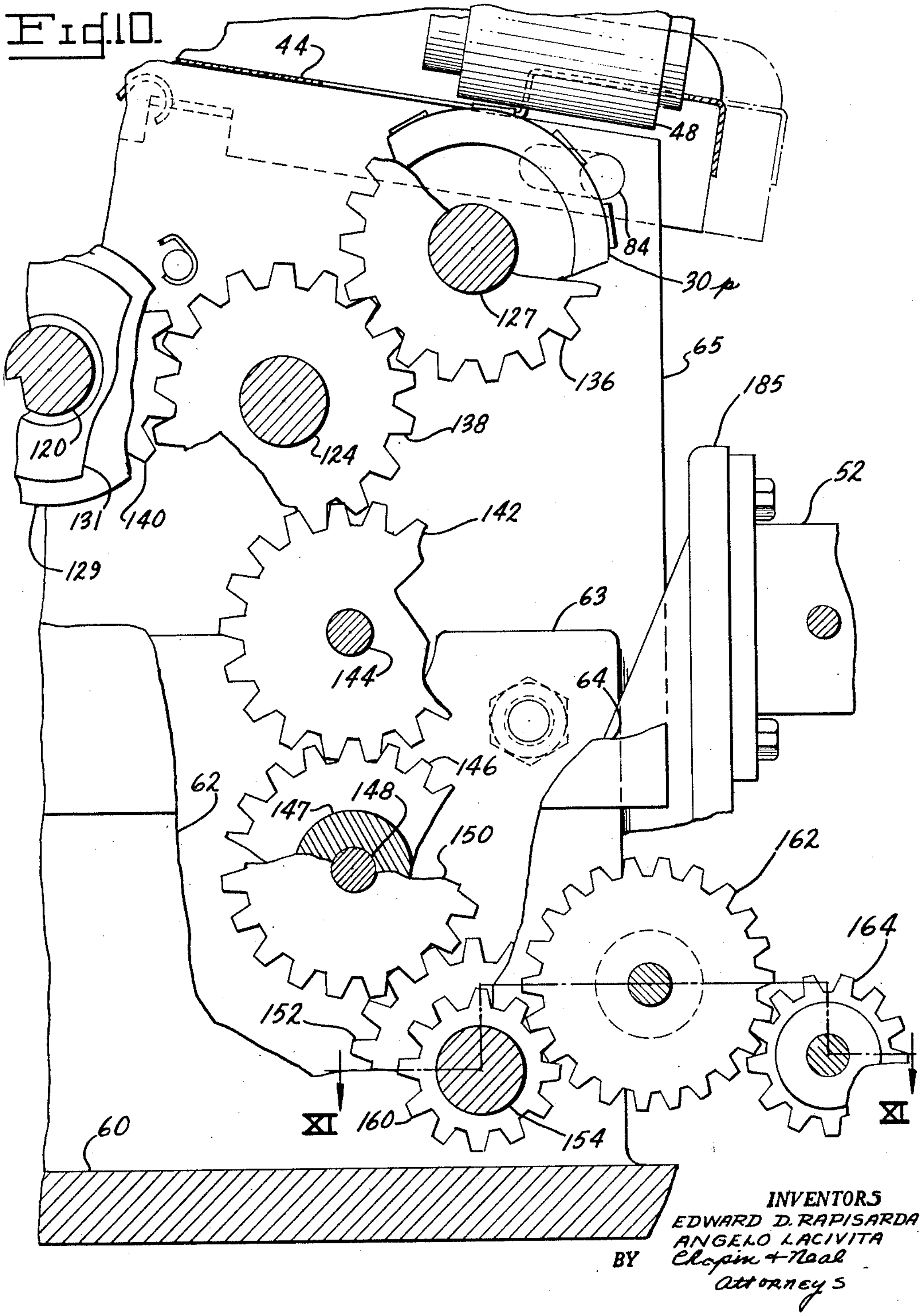
FIG. 10 is a section taken generally on line X-X in FIG. 4 and showing primarily the drive for the price per gallon wheels of the device and the means for adjusting the computing rate of the variator employed herein.
Figure 11:
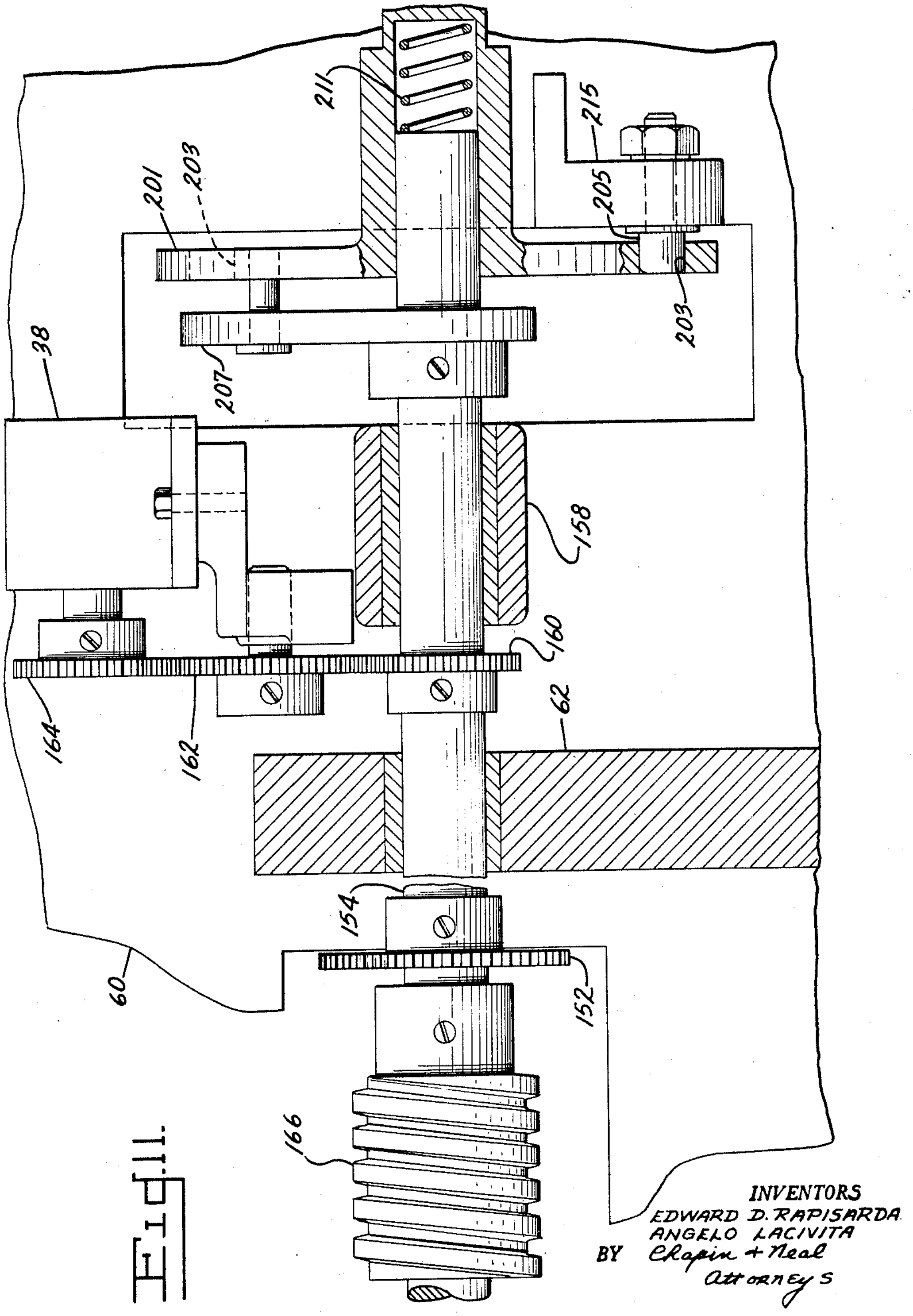
FIG. 11 is a section taken on line XI—XI in FIG. 10.
Figure 22:
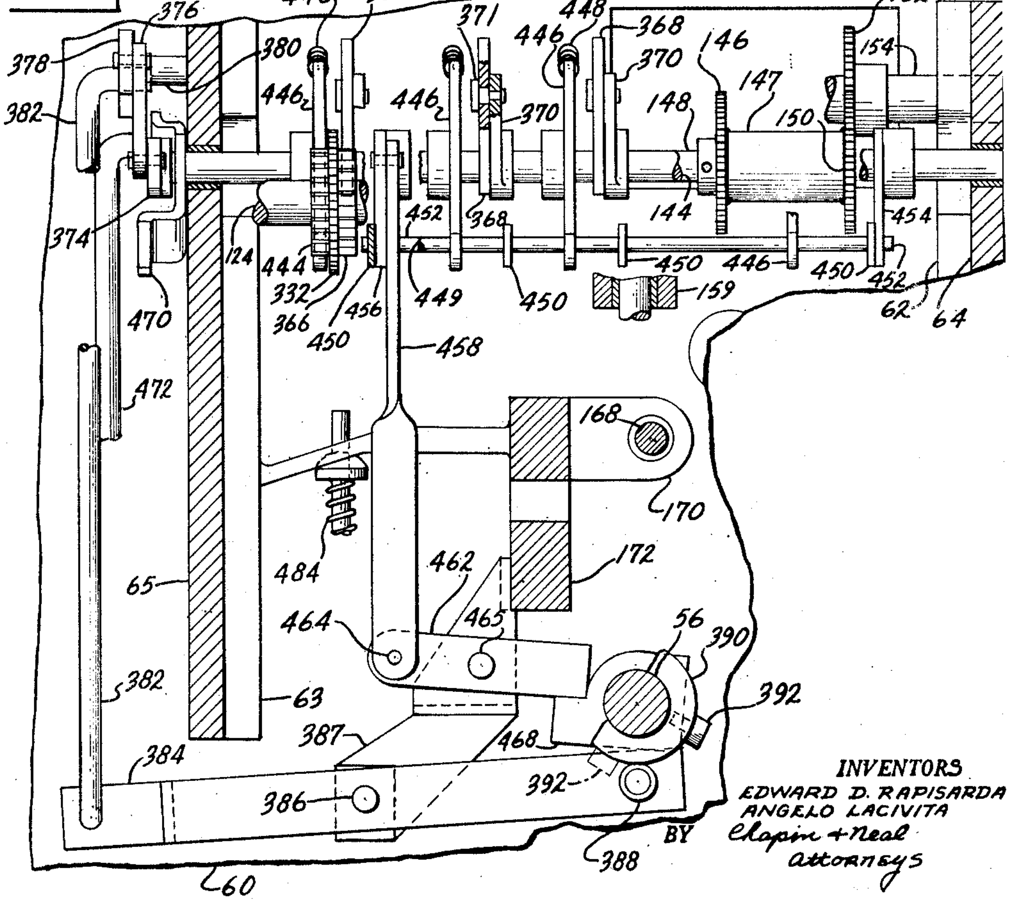
FIG. 22 is a section taken on line XXII—XXII in FIG. 21.

Referring now to FIG. 10, the price per gallon type wheels 30*p* (see also FIG. 3) are rotatably mounted on the shaft 127 and have pinned thereto spur gears 136 which respectively mesh with idler gears 138. The idler gears 138 are rotatably mounted on idler shaft 124 and mesh with gears 140 which are mounted on the reset shaft 120. The gears 140 have locking discs 129 and two tooth discs 131 secured thereto in the same fashion as the gears 118 and 130. These elements mesh with further Geneva gears 135 to incrementally transmit rotation from one gear 140 to the next successive gear 140. The gear for the lowest order type wheel 30*p* is driven through a gear 142 rotatably mounted on a shaft 144 and meshing with the associated idler gear 138. The shaft 144 is journaled on the plates 64. The gear 142 meshes with a gear 146 (see also FIG. 22) which is secured to a tubular hub 147 and journaled on a shaft 148. The shaft 148 is journaled on the frame walls 62. Also secured to the hub 147 is a gear 150 which meshes with a gear 152. The gear 152 is secured to a shaft 154 which is journaled (FIGS. 4 and 11) in a lug 156, the wall (as viewed from the front) 62, and another lug 158. The shaft 154 extends towards the left hand side of the printing unit and has a disc 201 telescoped over its outer end. The disc 201 has a series of ten holes 203 (see also FIG. 6) equiangular spaced on a common radius and adapted to selectively receive a pin 205. An arm 207 is secured to the shaft 154 and carries a pin 209 which is slidingly received by a hole in disc 201. The operating knob 36, seen in FIG. 1, is secured to the outer end of the hub for disc 201.

Figure 4:
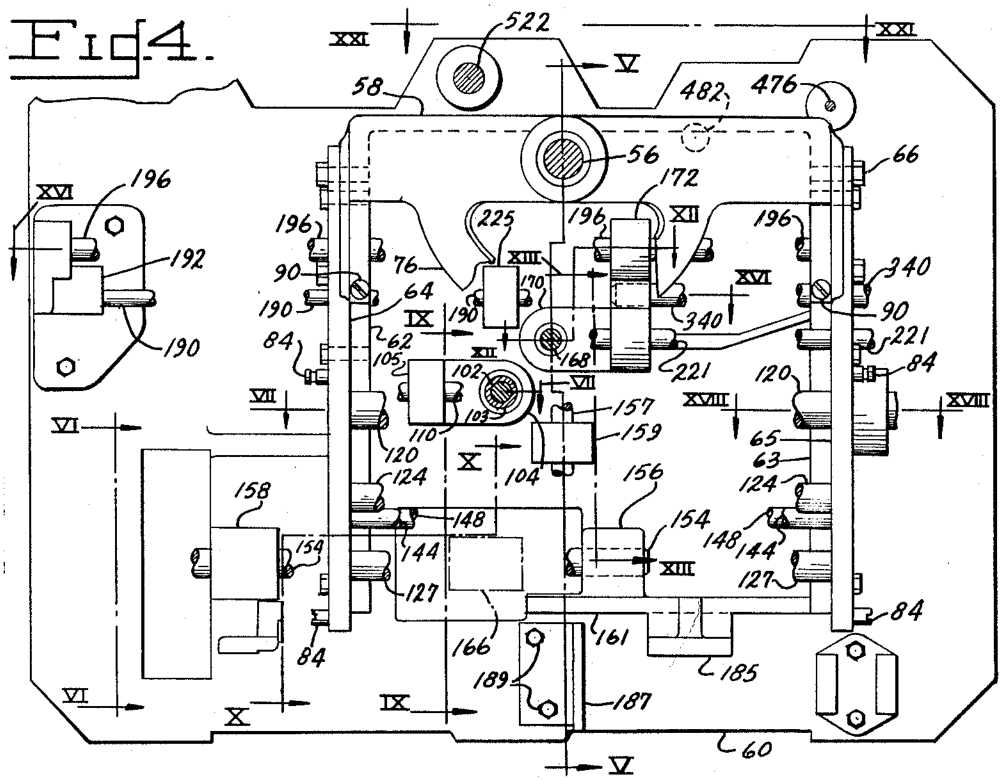
FIG. 4 is a plan view showing selected frame elements and shafts journaled thereon, with most other parts omitted.
Figures 5, 6:
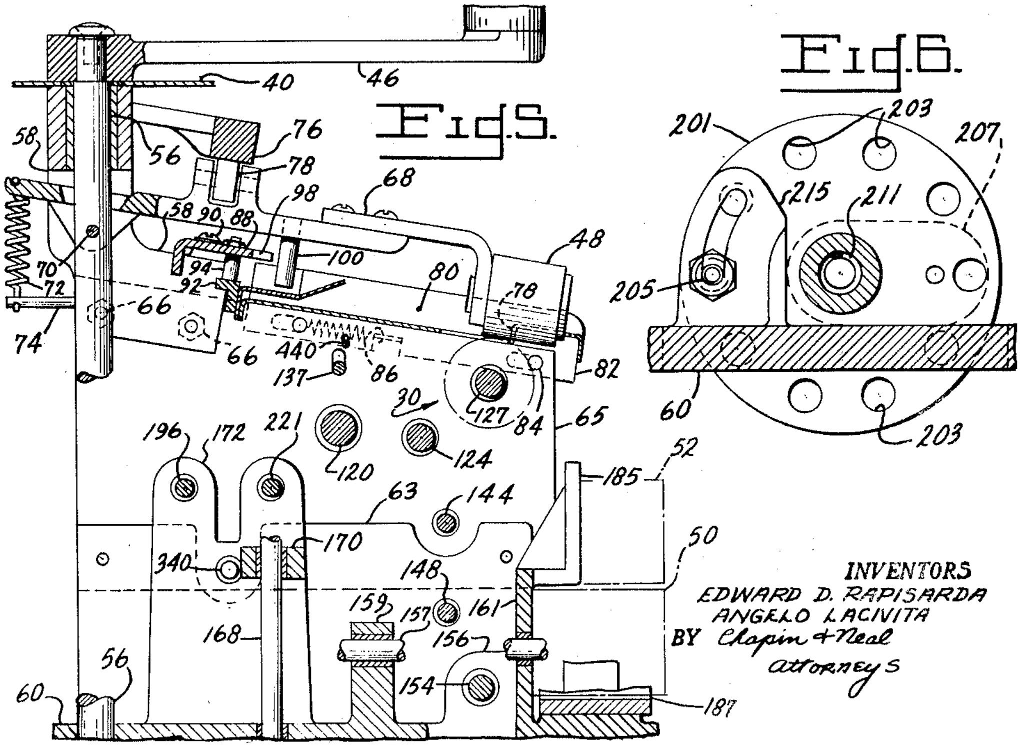
FIG. 5 is a section taken on line V—V in FIG. 4 and additionally showing a print arm in an intermediate position and a ticket holder.
FIG. 6 is a section taken on line VI—VI in FIG. 4.

Rotation of shaft 154 is accomplished by first pushing in on knob 36 to unseat the disc 201 from the pin 205. The knob 36 may then be freely rotated and, with it, shaft 154. Upon release of knob 36 spring 211 seats disc 201 on pin 205. If one of the holes 203 is not aligned with the pin 205, interlock means can be provided to sense that the disc 201 has not been properly seated and prevent operation of the printer unit or dispensing unit. Thus rotation of the shaft 154 is limited to fixed angular increments representing price variations of 1/10¢ per gallon. It will be seen that pin 205 is angularly adjustable in post 215 for calibration purposes. A gear 160 (FIGS. 10 and 11) is secured to the shaft 154 and meshes with an idler gear 162 which in turn drives a gear 164 secured to the shaft of the counter 38. A worm 166 is secured to the shaft 154 and meshes with a worm wheel segment 166′ (FIGS. 1 and 2) which is a component of the variator 32. As can be seen in FIG. 4, an opening is provided in plate 60 for the worm wheel segment 166′. The variator 32 is responsive to movement of the segment 166′ to change the rate of rotation of its "money" shaft 103 as taught in said copending application.

Rotation of the shaft 154 by knob 36 thus accomplishes three things: (*a*) the variator 32 is adjusted so that its output rate (rotation of shaft 103) will correspond to the established price of the fuel; (*b*) the type wheels 30*p* through the gear train including gears 150, 146, 142, 138 and 136, will be rotated to reflect this established price; and likewise the counter 38 will be rotated through the gear train comprising gears 160, 162 and 164 to give a visual indication of this established price.

*Drive for the Cost Indicating Type Wheels*

Figures 7, 8:
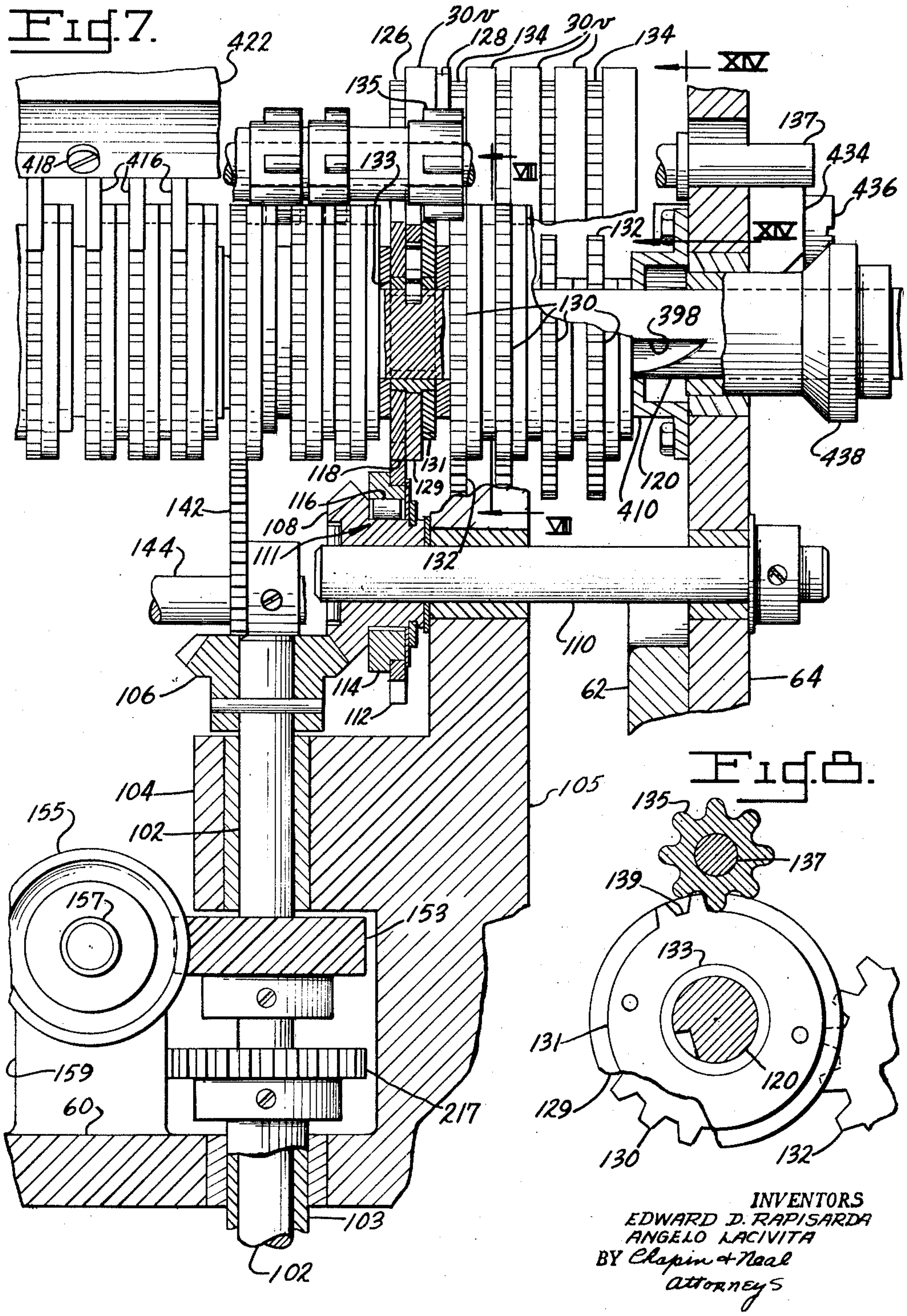
FIG. 7 is a section on an enlarged scale, taken generally on line VII—VII in FIG. 4 and showing primarily the drive for volume indicating wheels of the device.
FIG. 8 is a section taken on line VIII-VIII in FIG. 7.
Figure 9:
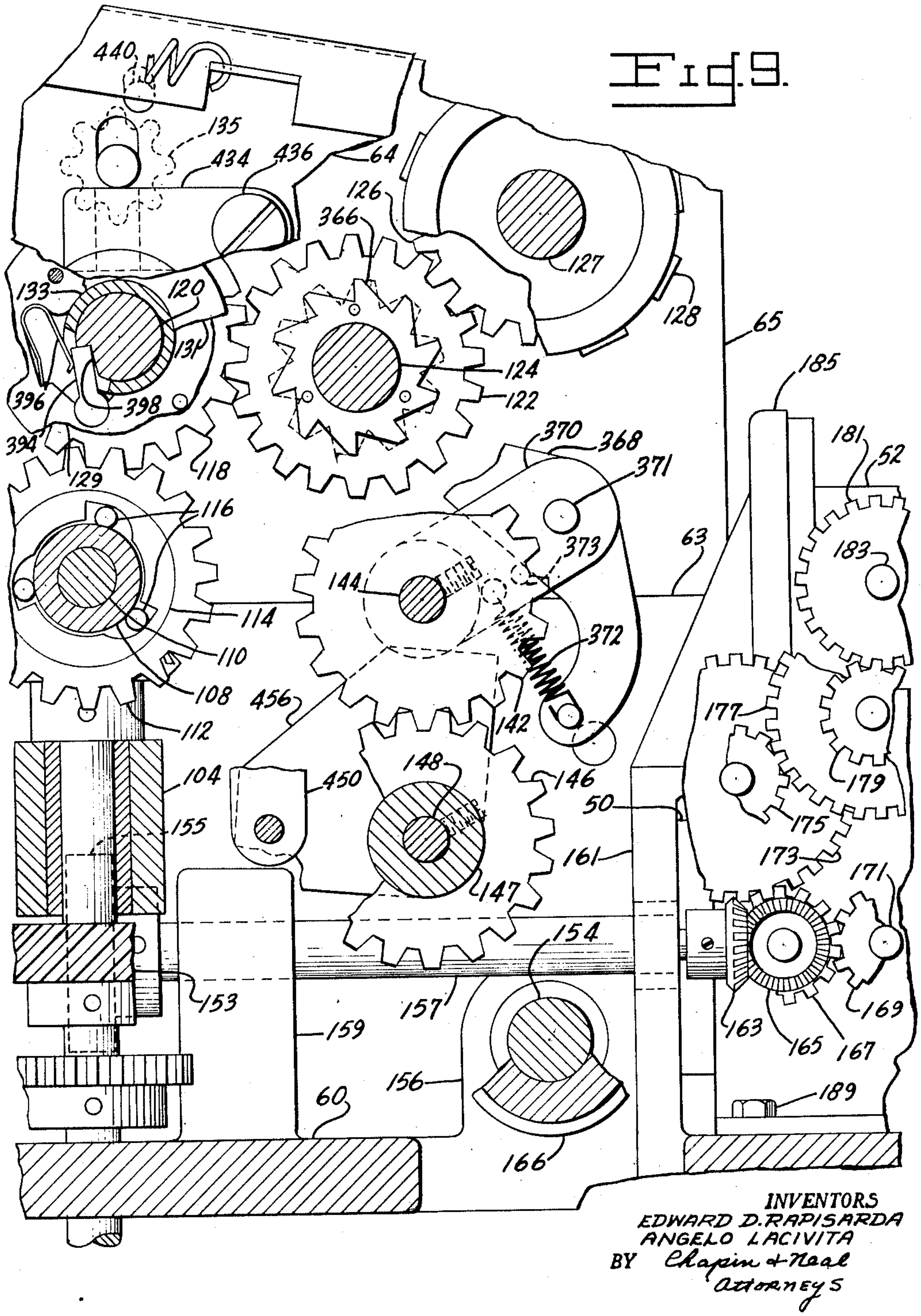
FIG. 9 is a section taken generally on line IX—IX in FIG. 4.
Figure 12:
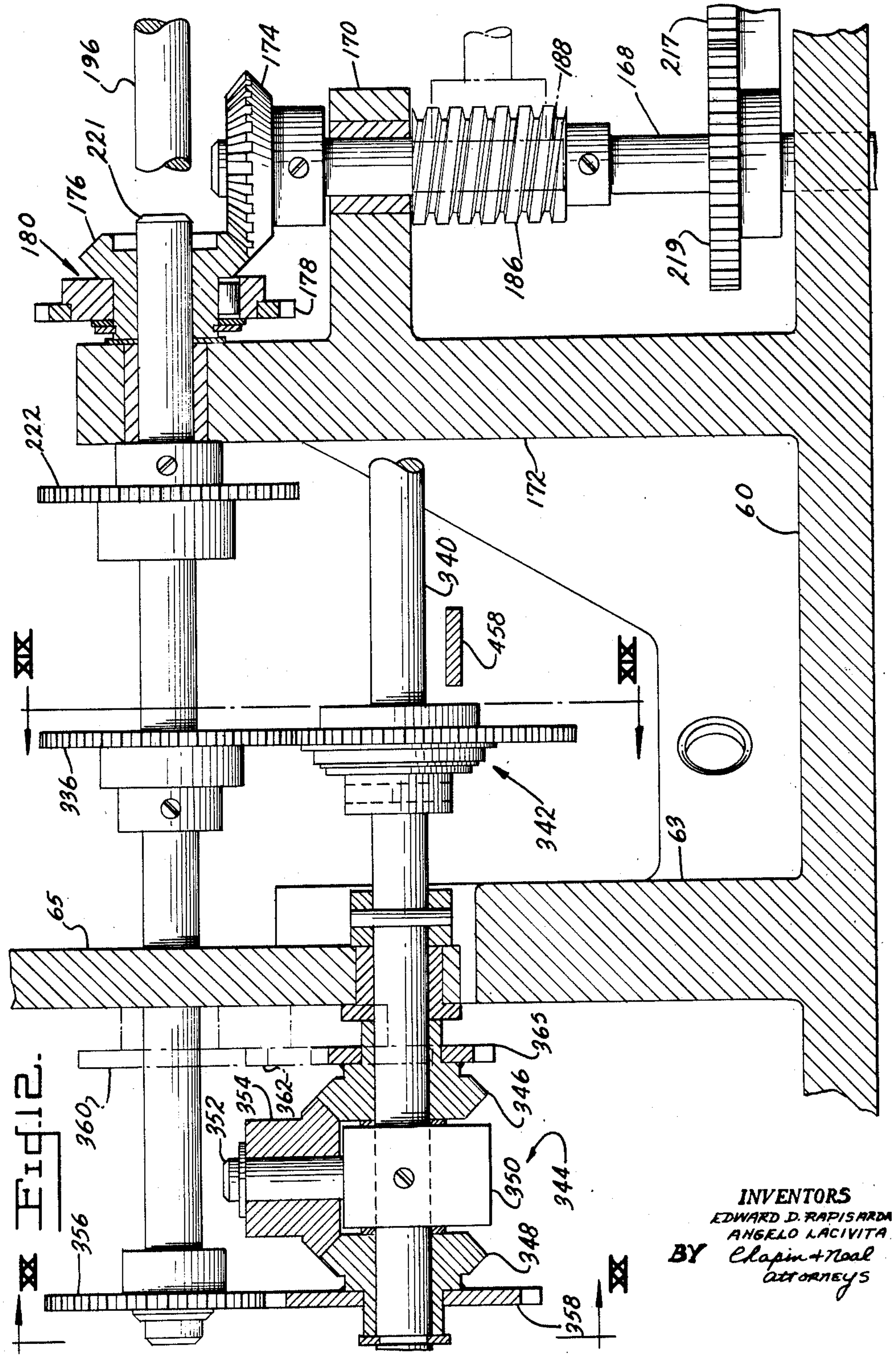
FIG. 12 is a section on an enlarged scale taken generally on line XII-XII in FIG. 4.
Figures 13, 14:
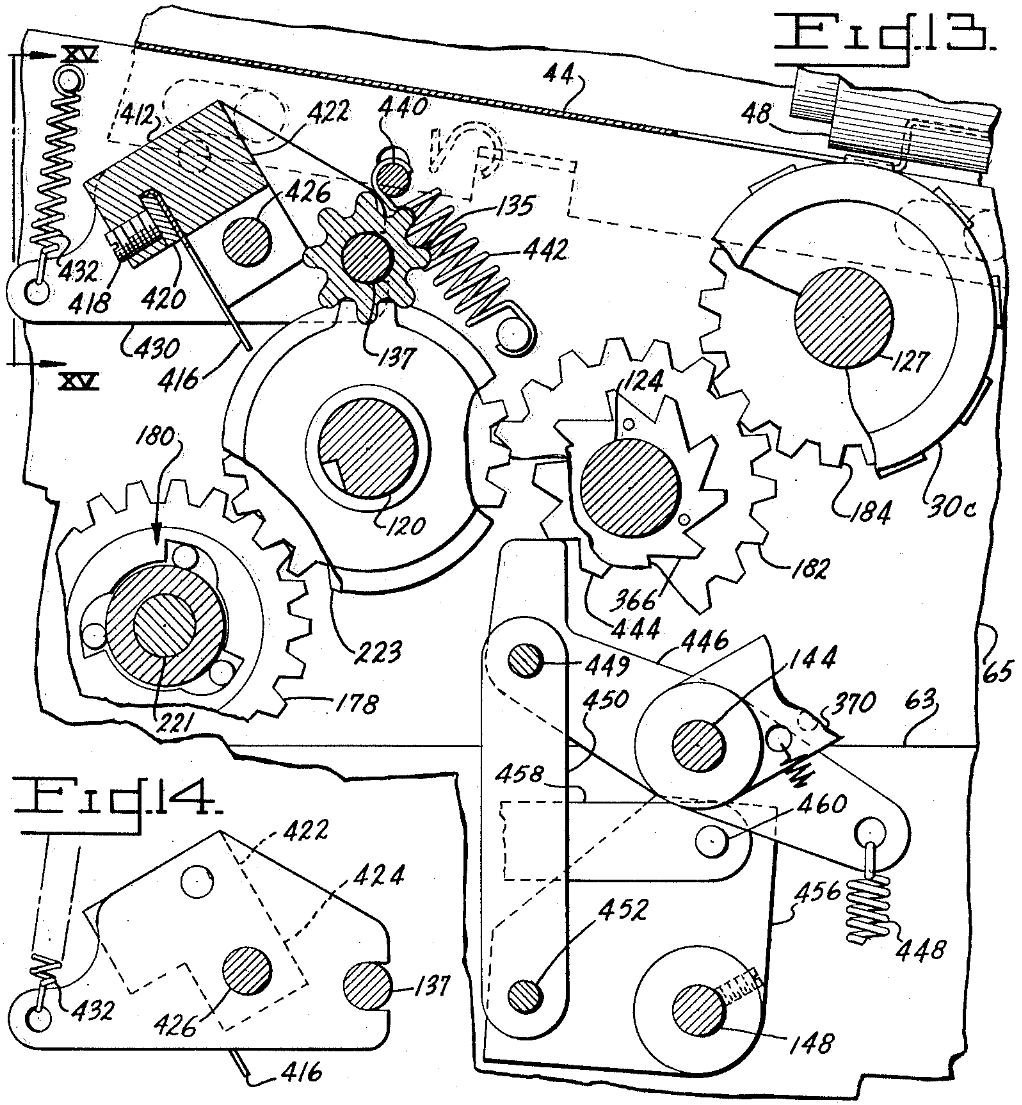
FIG. 13 is a section taken on line XIII—XIII in FIG. 4 and showing primarily the drive for the fuel oil cost wheels of the device.
FIG. 14 is a section taken on line XIV—XIV in FIG. 7.

Reference is next made to FIGS. 4 and 12 and cost indicating shaft or money shaft 103 of the variator, which is journaled in the plate 60 (FIG. 7) as previously noted. A gear 217 is secured to the upper end of shaft 103 and meshes with a gear 219 (FIG. 12) secured to a vertical shaft 168. The shaft 168 is journaled in plate 60 and also in an arm 170 projecting from a frame post 172. A bevel gear 174 is secured to the upper end of the shaft 168 and meshes with a bevel gear 176 secured to a shaft 221. The shaft 221 is journaled in the post 172 and plate 65 (see also FIG. 4). A spur gear 178 (FIGS. 12 and 13) is mounted on the hub of the gear 176 with a one-way clutch 180 providing a driving connection therebetween. The construction of clutch 180 is essentially the same as that of clutch 111 (FIGS. 7 and 9). The gear 178 is rotated in response to clockwise movement of the gear 176 while counterclockwise rotation of gear 178 can be had with the gear 176 remaining stationary. This again is for reset purposes later explained in detail.

The gear 178 meshes with a gear 223 mounted on the reset shaft 120. The gear 223 drives the lowest order, cents, cost, type wheel 30*c* (see also FIG. 13) through an idler gear 182 which meshes with a gear 184 pinned to type wheel 30*c*. Idler gear 182 is rotatably mounted on the shaft 124. Further drive gears 223 are mounted on the shaft 120 and arranged to rotate the remaining type wheels 30*c* through other gears 182 and 184 (not shown). Locking discs 129 and two tooth discs 131 are secured to each gear 223 to rotate each successively higher wheel 30*c* in increments of 1/10 revolution, through additional Geneva gears 135.

*Drive for the Tax Indicating Type Wheels*

Figure 16:
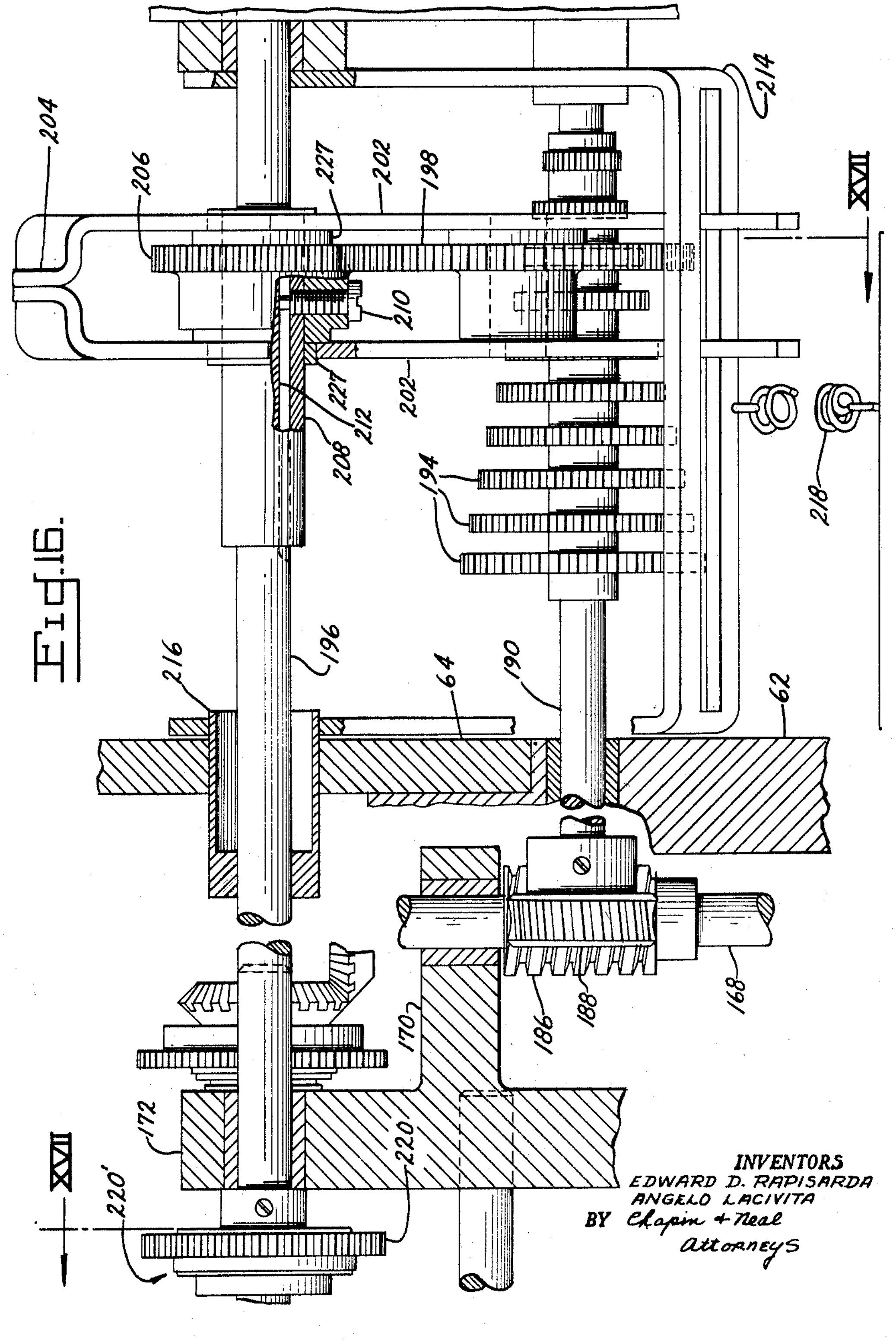
FIG. 16 is a section, on an enlarged scale, taken generally on line XVI-XVI in FIG. 4 and showing primarily the selective drive for tax indicating wheels of the device.
Figures 17, 18:
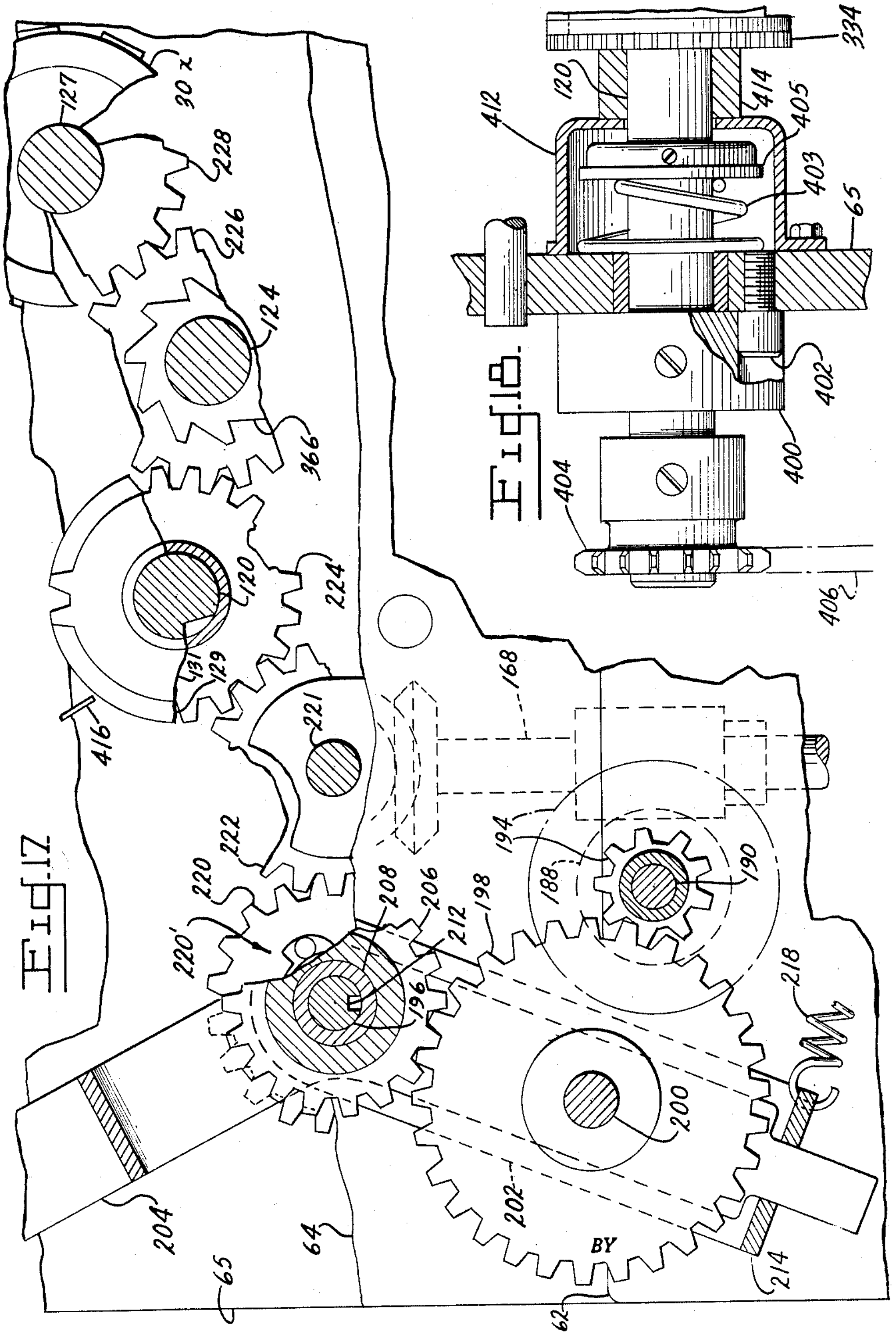
FIG. 17 is a section taken generally on lines XVII—XVII in FIG. 16.
FIG. 18 is a section on an enlarged scale, taken generally on line XVIII—XVIII in FIG. 4.

Referring now to FIGS. 12, 16 and 17, a worm 186 is secured to the shaft 168 and drives a worm gear 188 which is secured to shaft 190. The shaft 190 is journaled (see FIG. 4) on a post 225 in the frame wall 62, and on a bracket 192. The bracket 192 is secured to frame plate 60 by the illustrated screws. The shaft 190 rotates at a fixed rate relative to the rate of rotation of the money shaft 168. A cluster of spur gears 194 (FIGS. 16 and 17) are secured to the shaft 190. Means are provided to selectively drive an output shaft 196 from one of the gears 194. The shaft 196 (FIGS. 4 and 5) is journaled on the bracket 192, plate 64, post 172 and the other plate 65. These driving means comprise an idler gear 198 which is journaled on a shaft 200 extending between the forked arms 202 of a lever 204. The arms 202 embrace a gear 206 which is secured to a sleeve 208 by a screw 210. The screw 210 has a dog which is slidingly received in a longitudinal slot 212 formed in the shaft 196. The lever arms 202 are pivotally mounted relative to the sleeve 208 by means of flanged washers 227. The lower ends of the arms 202 are reduced in width and captured in a slot formed in the bridge of a U-shaped bracket 214. The bracket 214 is pivotally mounted at one end on the shaft 196 and at the other end on a journal sleeve 216 for that shaft. A spring 218 extends from the bracket 214 to a fixed point on the frame plate 60 to constantly urge the gear 198 into mesh with one of the gears 194.

Figure 3:
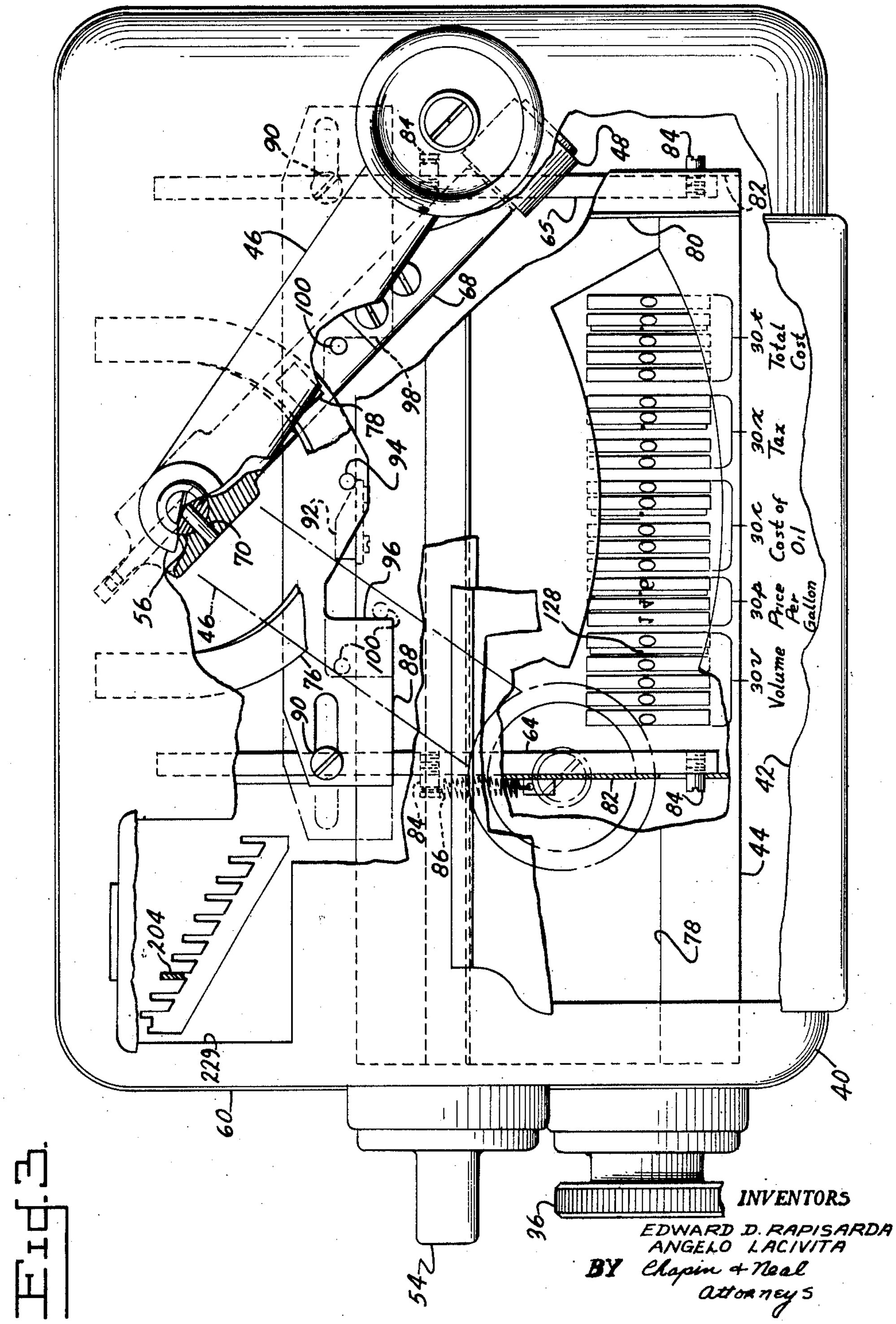
FIG. 3 is a plan view of the printer, on an enlarged scale, with portions thereof broken away and others in section.

The lever 204 projects upwardly through an opening 229 in the top wall of housing 40 (FIG. 3). This opening is provided with notches corresponding to the position of the lever 204 for meshing engagement with the various gears 194. Appropriate indicia can be provided adjacent these notched openings to indicate the rate at which the tax is computed when the lever 204 is seated therein. Means are also provided for positioning the lever 204 so that it is held out of mesh with the gears 194 where there is to be no tax on the fuel. It will be noted that bearing sleeve 216 permits sufficient sliding movement of the sleeve 208 for gear 198 to mesh with the largest gear 194.

A gear 220 (FIGS. 16 and 17) is mounted on the shaft 196 adjacent the post 172. The gear 220 is rotated by the shaft 196 through a one-way drive clutch 220′ essentially identical with the clutch 111 previously described in connection with the gear 112. Thus the shaft 196 will rotate the gear 220 in a clockwise direction while permitting the gear 220 to rotate in a counterclockwise direction as the shaft 196 remains stationary. The gear 220 meshes with an idler gear 222 mounted on the shaft 221. The idler gear 222 meshes with a gear 224 mounted on the reset shaft 120 and in turn meshes with a gear 226 rotatably mounted on the idler shaft 124. The gear 226 drives a gear 228 which is pinned to the lowest order tax type wheel 30*x*. Each of the remaining type wheels 30*x* has a gear 228 (not shown) pinned thereto which mesh with other idler gears 226 and drive gears 224 (which are also not shown). These further gears 226 and 224 are respectively rotatably mounted on the shafts 124 and 120. Each of the gears 224 comprises a sandwich formed by the locking disc 129 and two toothed disc 131 which cooperate with additional Geneva gears 135 to successively and incrementally rotate the gears adjacent the drive gear 224 for the lowest order wheel 30*x* in the manner previously described. The wheels 30*x* are thus capable of indicating the amount of tax on the fuel oil in each delivery up to $99.99 (see again FIG. 3).

The description herein given has been based on the premise that the tax is assessed as a fixed percentage of the selling price. However, if the tax were to be based on a fixed amount per gallon, then the drive for the cluster of gears 194 would be taken from the gallons shaft 102 rather than the shaft 168 which is driven from the money shaft 103.

*Drive for the Total Cost Type Wheels*

The total cost type wheels 30*t* (FIG. 3) reflect the sum of the fuel cost (shown on the wheels 30*c*) and the amount of the tax (shown on the wheels 30*t*). The lowest order wheel 30*t* (FIG. 19) is rotatably mounted on the shaft 127 and has a gear 330 pinned thereto. The gear 330 meshes with an idler gear 332 rotatably mounted on the shaft 124. The idler gear 332 in turn meshes with a drive gear 334 which meshes with another idler gear 336 (see also FIG. 12) rotatably mounted on the shaft 221. The gear 336 is driven by gear 338 which is mounted on a shaft 340. The shaft 340 is journaled on the post 172 (FIG. 4) and plate 65. A one-way drive clutch 342 provides a driving connection between the shaft 340 and the gear 338, whereby the gear 338 will be driven when the shaft 340 rotates in a clockwise direction and yet the gear 338 may rotate in a counterclockwise direction, while the shaft 340 remains stationary. Operation of clutch 342 is essentially the same as previously described in connection with gear 112 and clutch 111.

Shaft 340 (FIGS. 12 and 20) is the output shaft of an integrator 344 and comprises a pair of bevel gears 346, 348 rotatably mounted on the shaft 340 and a block 350 pinned thereto. The block 350 has a stud 352 on which is mounted a bevel gear 354. The bevel gear 354 meshes with both of the bevel gears 346 and 348.

One input for the integrator 344 is derived from the money shaft 103 through the previously described drive connections to the shaft 221. A gear 356 is secured to the outer end of the shaft 221 and meshes with a gear 358 which is secured to the hub of bevel gear 348. The second input for the integrator 344 is taken from the drive shaft 196 (FIG. 20) for the tax type wheels 30*x*. A gear 360 is secured to the outer end of the shaft 196 and meshes with an idler gear 362 rotatably mounted on a shoulder screw 364 threaded into the right hand frame plate 64. The gear 362 meshes with a gear 365 which is secured to the hub of bevel gear 346.

The shaft 340 will therefore be rotatable in response to rotation of either the shafts 221 or 196 and its rate of rotation will reflect the additive sum of the rates of rotation of both these shafts. The total cost wheels 30*t* are thus driven from shaft 340 at a rate such that the amount shown thereon will equal the total of the amounts shown on the wheels 30*c* and 30*x*.

*Type Wheel Leveling Mechanism*

It has been discovered that the lowest order type wheels 30*v*, 30*c*, 30*x* or 30*t* will each be located in random positions at the end of a delivery of fuel oil. It is therefore preferably to provide the type wheel leveling means, now to be described, in order to insure a clear impression from these specified type wheels. The effect of these means is to register or level one of the numerals on each of said type wheels relative to the ticket T as it is positioned by the carrier 44. Briefly speaking, the leveling means advances each of said type wheels whatever small angular displacement is necessary to bring the next successive numeral thereon into proper register.

A ratchet wheel 366 is secured to each of the idler gears 122, 182, 226 and 332 (FIGS. 9, 13, 17 and 19 respectively) for the lowest order print wheels 30*v*, 30*c*, 30*x* and 30*t*, respectively. A pawl 368 is (FIGS. 19, 21 and 22) operatively positioned relative to each ratchet 366 being pivotally mounted at the end of an arm 370 (FIG. 19 in particular) by means of a headed pin 371 riveted thereto. A spring 372 extending between the pawl 368 and the arm 370 pulls the pawl 368 into engagement with a pin 373 projecting from the arm 370. The spring 372 also permits the pawl 368 to yield in a clockwise direction. The arm 370 is secured to the shaft 144 by a pin extending through the hub therefor. The shaft 144 projects beyond the plate 65 and has a lever 374 (FIGS. 21, 22 and 23) secured to its outer end. A link 376 connects the lever 374 to the upper end of a lever 378 which is pivotally mounted on pin 380 projecting from plate 65. A rod 382 extends from the lower end of the lever 378 to a lever 384 (FIGS. 21 and 22) pivotally mounted about pin 386 at the rear of the printing device. The pin 386 is mounted on a sheet metal bracket 387 which is secured to the post 172. A cam roll 388 is mounted on the opposite end of the lever 384 and bears against a cam 390 which is secured to the operating shaft 56.

Figures 19, 20:
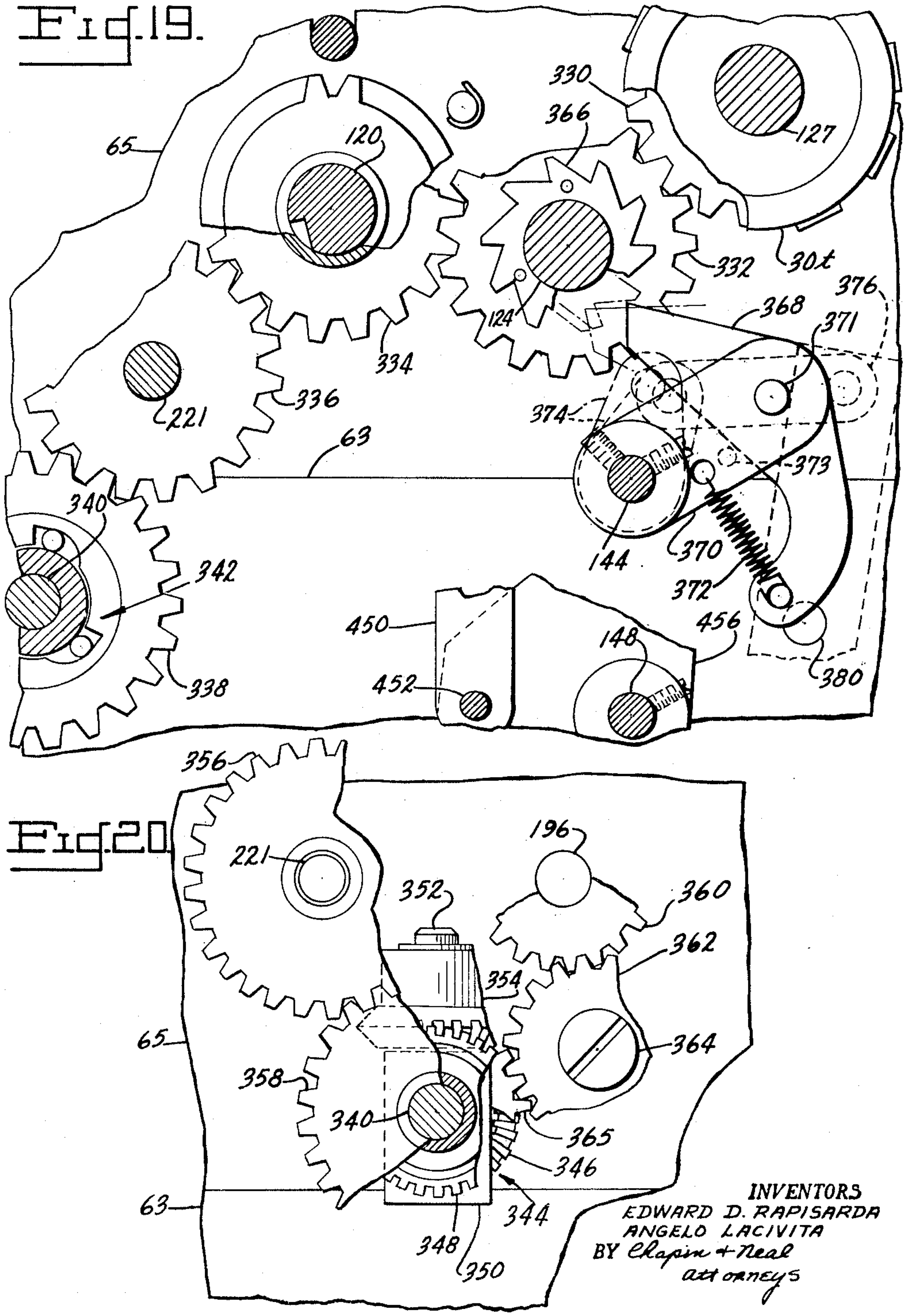
FIG. 19 is a section taken generally on line XIX—XIX in FIG. 12.
FIG. 20 is a section taken on line XX—XX in FIG. 12.

Cam 390 has an actuating lug 392 secured thereto which is shown in the position it assumes when the operating lever 46 is in its rest position. The phantom showing of lug 392 indicates its position after the operating lever 46 has been swung to zero print a ticket and in the position it assumes while the printed ticket is in its operative position for the delivery of fuel oil. Upon the completion of a delivery of fuel oil, the shaft 56 is rotated in a counterclockwise direction, by manual operation of lever 46, causing the lug 392 to momentarily displace the came roll 388 outwardly thereby pivoting the lever 384 in a clockwise direction. This movement is transmitted through link 382 to pivot the lever 378 (FIG. 23) also in a clockwise direction. This movement is then transmitted to link 376 and arm 374 to cause the shaft 144 to rock in a clockwise direction. Referring now to FIG. 19, as viewed therein, the shaft 144 is rocked in a counter clockwise direction swinging with it the arm 370 and bringing the pawl 368 into engagement with one of the teeth of ratchet 366. The pawl 368 is swung to the indicated phantom position each time thereby bringing the pawl 366 to one of ten possible angular positions which are correlated to the associated type wheel to position one of the numerals thereon in proper register or level with the card positioned by the carrier 44.

This leveling action takes place prior to the roller 48 contacting the ticket T to print an impression thereon. Once the type wheels are level, the lug 392 passes beyond the roll 388 and the described mechanism is returned to its full line positions by a spring 394 which extends from the lever 378 (FIG. 23) to a pin projecting from the frame wall 63.

It is, of course, apparent that the leveling mechanism is actuated immediately after the zero print operation as the lever 46 is displaced to its operative position and the lug 392 passes it to its illustrated phantom position. In the operative position of the lever 46 the lug 392 has passed beyond the roll 388 so that the pawls 368 are spaced from the ratchets 366 as the various type wheels 30 are driven during the delivery of fuel oil.

*Reset Mechanism*

As has been mentioned after each delivery of fuel oil and printing of a final reading on a ticket T it is necessary to reset the various type wheels 30 to their zero positions. To this end a single-tooth, one-way clutch connection is provided between the reset shaft and the various drive gears 118 (FIG. 7), 130 (FIG. 8), 178 (FIG. 13), 220 (FIG. 17), and 334 (FIG. 19). This includes all of the gears mounted on the shaft 120, with the exception of the gears 140 which are employed in setting the price wheels 30*p*.

Each one-way clutch comprises a tooth 394 which is pivotally mounted on the Geneva locking disc 129 (FIG. 9). A leaf spring 396 bears against the tooth 394 and yieldingly urges it against the shaft 120. A longitudinal groove 398 is formed in the shaft 120 coextensive in length with the named drive gears. One surface of groove 398 abuts the end of the tooth 394 when the shaft 120 is rotated in a counterclockwise direction. The other surface of this groove cams the tooth 394 outwardly, permitting rotation of the disc 129 in a clockwise direction. The one-way clutches just described permits the various named driving gears to rotate freely in a counterclockwise position as they drive the various type wheels 30 in response to operation of the variator 32. Upon completion of a delivery of fuel oil, the shaft 120 may be rotated one full revolution in a counterclockwise direction to return the various driving gears and their associated type wheels to their zero positions.

The reset operation is manually performed by pushing in on the knob 54 (FIG. 1) and then rotating the shaft 120. More specifically, it will be seen (FIGS. 7 and 18), that the shaft 120 is journaled on the plates 64 and 65 and is also axially slidable relative thereto. A spring 403 (FIG. 18) acting against a thrust bearing 405 yieldingly maintains the shaft 120 in its operative position as determined by engagement of a collar pinned thereto with the plate 65. The collar 400 is slotted (see also FIG. 23) to receive a screw head 402 to thereby establish a fixed angular position for the shaft 120 in its operative position.

In order to reset the type wheels, the shaft 120 must first be axially displaced against the force of spring 403 to unseat the collar 400 from the screw 402. The shaft 120 may then be rotated in a counterclockwise direction (FIG. 9) to reset the type wheels by the groove 398 engaging the teeth 394. Once a full revolution of the shaft 120 is completed, all the type wheels 30 will be in their zero positions and the collar 400 will again be seated on the screw 402.

Referring again to FIGS. 7 and 18, it will be seen that means are provided for maintaining said named driving gears stationary as the shaft 120 is shifted axially. A cup-shaped retainer 410 is secured to the plate 64 and bears against the disc 131 attached to the outer gear 132. A cup-shaped retainer 412 is secured to the plate 65 and bears against a collar 414 which in turn bears against the outer gear 334. All gears on the shaft 120 are thus held in fixed lateral relation relative to the plates 64 and 65.

A sprocket 404 is secured to the shaft 120. A chain 406 (FIG. 23) extends from the sprocket 404 to a sprocket 408 which is secured to the shaft of counter 50, and arranged to zero that counter as well.

It will be noted that the previously described one-way clutches 111 (FIG. 9), 180 (FIG. 13), 221 (FIG. 17) and 342 (FIG. 19) permit the reset operation to be accomplished while the variator 32 and the various elements driven thereby up to these named one-way clutches, remain stationary.

In order to reset the type wheels 30, it has been found preferable to disengage the various Geneva gears 135 from the driving gears with which they mesh. When this is done, it has also been found preferable to restrain these drive gears from free rotation so that they will not ride ahead of the groove 398 in being reset to their zero positions.

Figure 15:
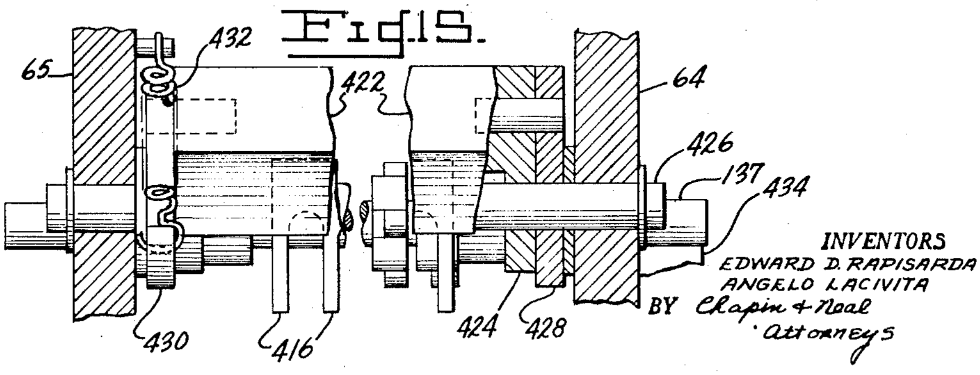
FIG. 15 is a view taken on line XV—XV in FIG. 13 with portions thereof broken away and showing primarily a restraining element.

The means for accomplishing this last-named end take the form of spring fingers 416 (FIGS. 13–15) which are swung into engagement with the named drive gears as the Geneva gears 135 are disengaged therefrom. The spring fingers 16 are formed after the fashion of a comb (see also FIG. 7) which is clamped by screws 418 and a bar 420 in a slot formed in a holder 422. The holder 422 has depending ears 424 which receive a shaft 426 pivotally mounted on the plates 64 and 65. Plates 428, 430 are secured as by brazing to opposite ends of the holder 422. The plates 428 and 430 are slotted to receive the shaft 137 for the Geneva gears 135. Springs 432 are attached to the plates 428 and 430 and tend to rotate these plates in a clockwise direction thereby applying a force to the shaft 137 which tends to maintain the Geneva gears 135 in their operative positions.

The Geneva shaft 137 extends beyond the frame plate 64 (FIGS. 7 and 9) and overlies a lever 434 which is pivotally mounted by screw 436 on the plate 64. A collar 438 is secured to the shaft 120 and has a tapered portion which underlies the lever 434 and cams the lever 434 upwardly when the shaft 120 is axially displaced to commence the reset operation. As the lever 434 is cammed upwardly, the shaft 137 is displaced upwardly in the slot formed in the plate 64 (refer also to FIGS. 13, 15). Thus upward force is transmitted to plate 428 so that the carrier 422 is swung in a counterclockwise direction bringing the spring fingers 416 into engagement with the drive gears aligned therewith. The plates 428 and 430 are also swung to raise both ends of the shaft 137 and disengage the Geneva gears 135 from said drive gears.

The rod 440 (FIG. 13) spans the plates 64 and 65 and is slidable in vertical slots formed therein. The rod 440 is disposed immediately above the Geneva gears 135. As the Geneva gears 135 are raised, the rod 440 will fit between the teeth thereon and also be raised against the force of springs 442 acting at each of its ends. The gears 135 are thereby in a fixed angular position so that they will later mesh with the drive gears which are returned to a fixed angular position upon completion of the reset operation. It will be remembered that the leveling mechanism, including pawls 368, is actuated before final print (and likewise before reset) to displace the lowest order numeral wheels 30 to given incremental positions. In so doing, all of the drive wheels will be displaced (if need be) to positions in which the rod 440 will be readily meshed between teeth on the gears 135.

It will be remembered that the Geneva gears 135 do not mesh directly with the drive gears for the lowest order type wheels, as can be seen by referring to gear 118 in FIG. 7. Because of this, these particular drive gears have a tendency to ride past the zero positions after being reset, since the restraining fingers 416 are disengaged therefrom while sufficient inertia remains to continue their rotation.

The means now to be described provide further restraint to avoid rotation of these gears and assure the type wheels being reset to a zero position. These means comprise a toothed disk 444 (FIG. 13) secured to each of the idler gears which mesh with the lowest order type gear. Four pawls 446 (see also FIGS. 21 and 22) are pivotally mounted on the shaft 144 and are respectively urged into engagement with the disks 444 by springs 448. A rod 449 interconnects all of the pawls 446. A plurality of links 450 connect the rod 449 with a second rod 452 spaced therebeneath. The rod 452 extends between a pair of lever arms 454 and 456. A link 458 is pivotally connected to the lever 456 at 460 and is pivotally connected to a lever 462 at 464. The lever 462 is pivotally mounted by pin 465 on the bracket 387 and projects into abutting relation with a cam member 468 pinned to the operating shaft 56. With this arrangement the pawls 446 normally prevent free rotation of any of the gears in the train including the lowest order type wheel. When the operating hand lever is swung to its delivery position cam member 46 engages the lever 462 to retract the link 458. The rod 458 is then swung downwardly to swing the pawl 446 free of the disks 444 so that the gears to which they are attached will be free to rotate without restraint during the delivery of fuel oil. As soon as the operating lever is swung back toward the start position the pawls 446 are reengaged so that the desired restraint will be effective when the type wheels are later reset.

*Interlocks*

There are two interlocks provided in the printer unit; one prevents movement of the operating lever to print a zero reading prior to resetting of the type wheels; and the other prevents delivery of fuel oil unless there has been both a zero print and a final print.

The mechanism for accomplishing this first end comprises a lever 470 (FIG. 23) which is pivotally mounted on the shaft 144. A rod 472 connects the lower end of the lever 470 with another lever 474 (FIGS. 21 and 24) which is pivotally mounted on a pin 476 projecting from a boss on plate 60. The lever 474 engages a pin 478 projecting from the undersurface of a disc 480 which is pivotally mounted on a pin 482 projecting from the plate 60. An "over-the-center" spring toggle 484 acts against the disc 480 to urge the pin 478 toward the lever 476. A latch 488 is pivotally mounted on the pin 482 and is urged into engagement with a single tooth cam 490 by an upstanding pin 486 on the disc 480.

Figure 21:
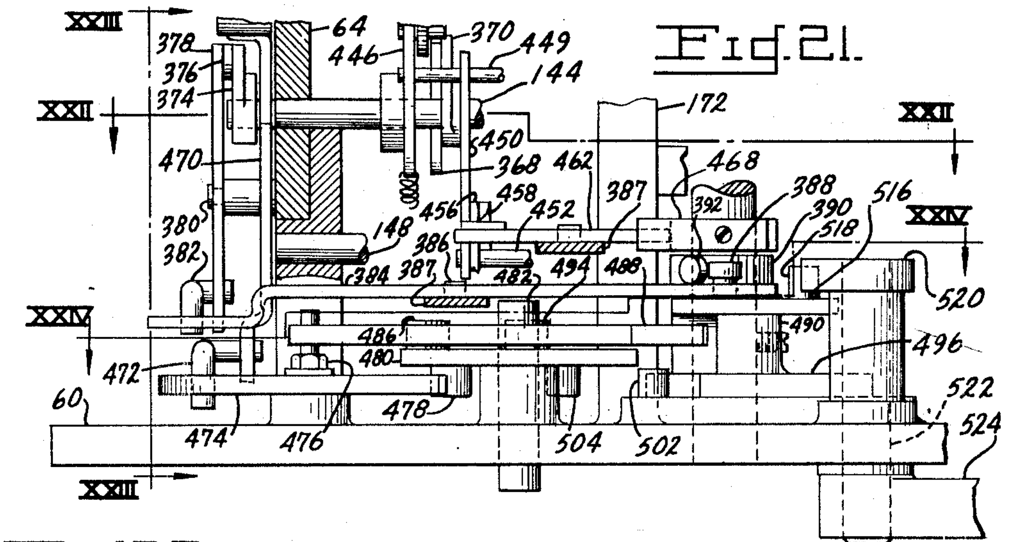
FIG. 21 is a view on an enlarged scale taken on line XXI-XXI in FIG. 4.
Figures 23, 24:
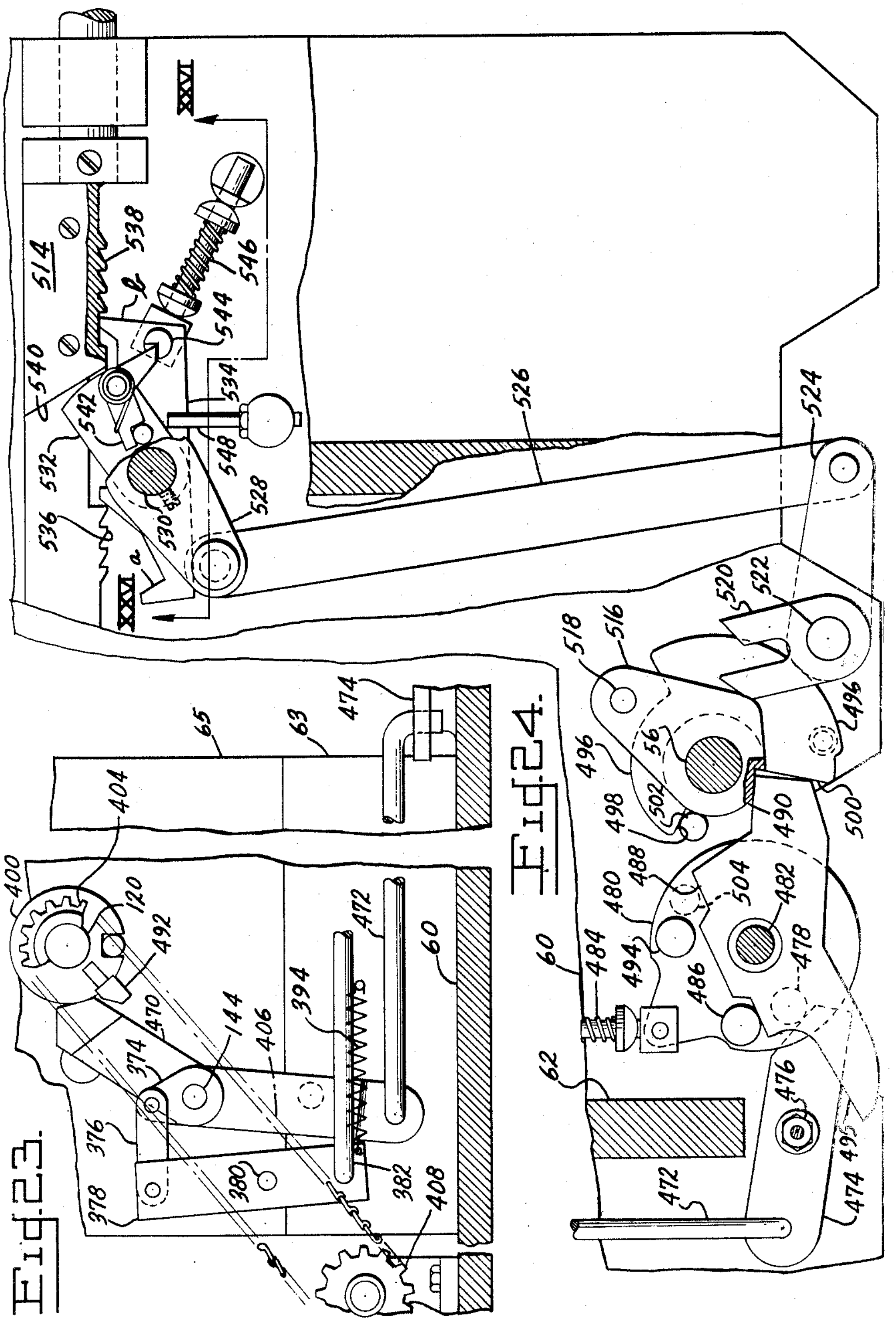
FIG. 23 is a section taken generally on line XXIII—XXIII in FIG. 21.
FIG. 24 is a section taken generally on line XXIV—XXIV in FIG. 21.

The position illustrated in FIGS. 21, 23 and 24 shows the parts as they would be after a final print and before the type wheels have been reset. At this time, as will be evident, the operating shaft 56 cannot be rotated in a clockwise direction to zero print a ticket. However, when the reset shaft is rotated to zero the print wheels, a lug 492 projecting from the collar 400 (FIG. 23) will engage the lever 470 pivoting it in a counterclockwise direction. This movement is transmitted to the lever 476 (FIG. 24) causing it to pivot in a counterclockwise direction and thereby rotate the disc 480 in a clockwise direction. The spring toggle 484, once it passes over center, will continue to rotate the disc 480 in a clockwise direction so that a pin 494 thereon engages the latch 488 and spaces it from the cam 490. Clockwise rotation of disc 488 is limited by engagement of a tail 495, projecting therefrom, with the pin 476. After the lug 492 is rotated beyond the lever 470 the latch 488 is clear of the cam 490 so that the shaft 56 is free to rotate and also the disc 488 is free to be returned to its original position.

After the type wheels 30 are reset, the operating lever 46 and shaft 56 may now be rotated in a clockwise direction to zero print a ticket. Rotation of shaft 56 is limited by a flange 496 (FIGS. 21 and 24) extending radially from the lower end of cam 490. The flange 496 is cut away to define edges 498 and 500 which engage a fixed pin 502 to limit rotation of the shaft 56 to a fixed angular extent of approximately 90°. The surface 498 engages the pin 502 when the lever 46 and shaft 56 are in their start positions and the surface 500 engages the pin 502 when lever 46 and shaft 56 are in their delivery positions.

As the lever 46 is rotated towards its delivery position, the surface 500 engages a pin 504 projecting downwardly from the disc 480. The disc 480 is rotated in a counterclockwise direction to a point where the spring toggle 484 urges it towards the position shown in FIG. 24. At this time the single tooth of cam 490 has been rotated in a clockwise direction and the pawl 488 is yieldingly urged thereagainst. Once the delivery of fuel oil has been completed, the shaft 56 will again be rotated in a counterclockwise direction to the position seen in FIG. 24 whereupon the pawl 488 will automatically snap into abutting relation with the single tooth on the cam 490 thereby preventing subsequent rotation of the shaft 56 in a clockwise direction prior to the type wheels 30 again being reset.

Figure 28:
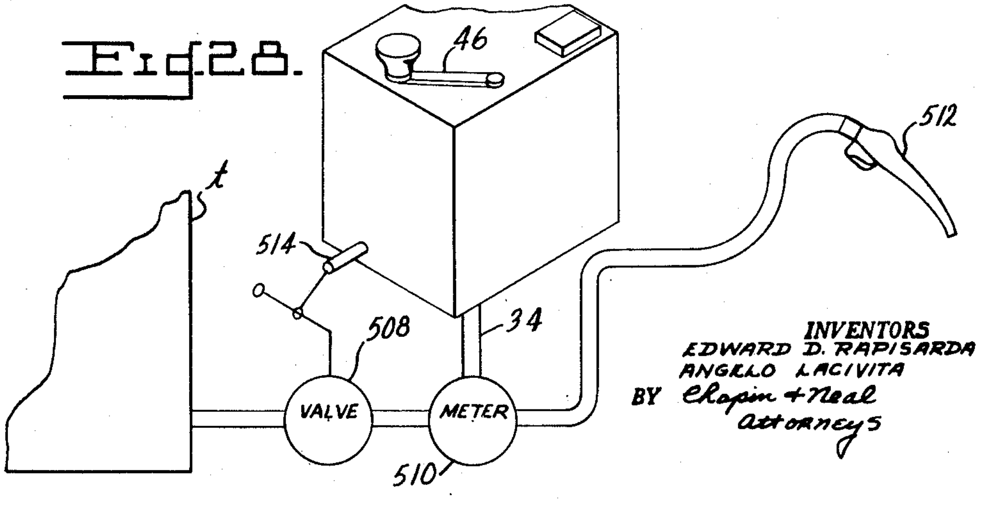
FIG. 28 is a perspective view diagrammatically showing the printing device incorporated in a fuel delivery system.

Referring next to FIG. 28, the present printer unit is normally employed in the illustrated combination. Fuel oil passes from a tank *t* to a manually operated valve 508, and then to a meter 510. The rotated element of the meter is connected to the shaft 34 driving the variator 32 of the printing unit. Fuel oil passes from the meter 510 through an outlet hose, to a discharge nozzle 512 which is preferably of the automatic shut-off type. A bar 514 is connected to the operating arm of the valve 508. The means now to be described prevent the operating arm of valve 508 from being swung to open the valve prior to the operating lever 46 being rotated to its delivery position to thereby zero print a ticket. These same means also prevent the bar 514 from being moved in the opposite direction to close valve 508 prior to the operating lever 46 being swung back to its start position to thereby print a final reading on the ticket.

Figure 25:
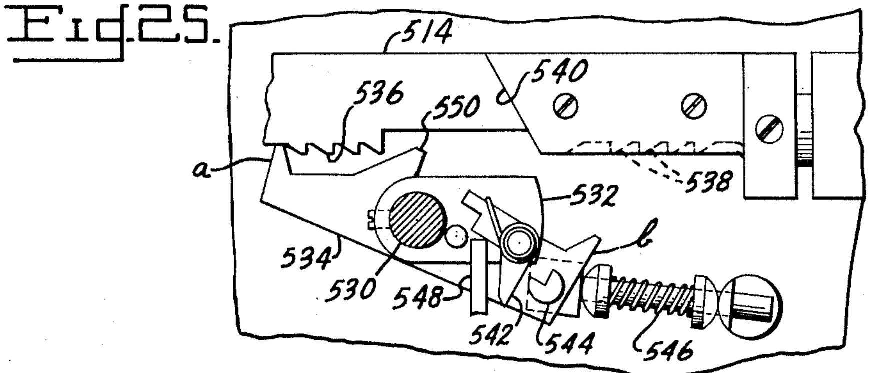
FIG. 25 is a view showing an alternate position of certain interlock components seen in FIG. 24.
Figure 26:
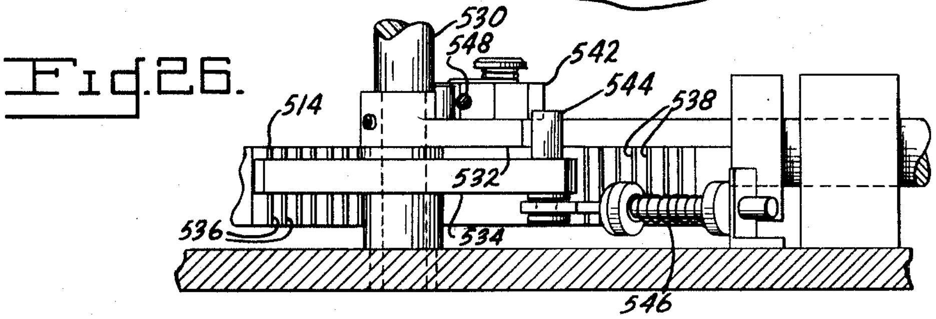
FIG. 26 is a section taken on line XXVI—XXVI in FIG. 24.

These means will now be more specifically described by referring to FIGS. 24–26. An arm 516 extends radially from the upper end of the cam 490 and carries an upstanding pin 518. The pin 518 is arranged to enter a slot formed in a lever 520 just as the operating shaft 56 is rotated to its delivery position. The lever 520 is secured to the upper end of a shaft 522 which is journaled in the plate 60. An arm 524 is secured to the lower end of the shaft 522 and is connected by a link 526 to a lever 528, spaced beneath the plate 60. The lever 528 is secured to a shaft 530. An arm 532 is also secured to the shaft 530 immediately above a double-ended pawl 534 which is pivotally mounted on the shaft 530. End *a* of pawl 534 is arranged to be swung into operative relation with a series of ratchet teeth 536 formed on the bar 514 while end *b* of pawl 534 is arranged to be swung into operative relation with a series of teeth 538 formed on the bar 514. A stop plate 540 is secured to the upper surface of the bar 514 in cooperative relation to the arm 532.

In the illustrated position of the parts in FIG. 24, the bar 514 is prevented from being shifted toward the left by arm 532 being in obstructive relation with the plate 540 and also by end *b* of pawl 534 being in engagement with the teeth 538. With the bar 514 thus locked, means are provided for preventing the valve 508 from being opened prior to zero printing a ticket. When the zero print is made operating lever 46 is swung to its delivery position; shaft 530 will be rotated in a clockwise direction, bringing the arm 532 clear of the plate 540 to the position illustrated in FIG. 25. As the arm 532 is thus swung, a latch 542 pivotally mounted thereon engages a notched pin 544 projecting upwardly from the pawl 534. The pawl 534 is thus swung in a clockwise direction with the arm 532. At this point, it will be noted that an "over-the-center" spring toggle 546 first maintains end *b* of pawl 534 in operative relation to the teeth 538 and then as the pawl 535 is swung in a clockwise direction, the spring toggle 546 continues this movement of the pawl to bring end *a* thereof against the bar 514 and into operative relation with the teeth 536. While this rotative movement of the pawl 534 is initiated by the arm 532 the latch 542 is disengaged from the pin 544 after the spring toggle 546 becomes effective to rotate the pawl 534 in a clockwise direction. This disengagement results from the tail of latch 542 meeting a fixed pin 548. The clockwise movement of both the arm 532 and the pawl 534 continue to the positions illustrated in FIG. 25. Movement of pawl 534 is now independent of the movement of lever 532 and is controlled by the spring toggle 546.

As can be seen from FIG. 25, the bar 514 is now free to be shifted to the left, thereby permitting the valve 508 to be opened for the delivery of fuel oil. When the bar 514 is so shifted, the leading tooth 538 engages a projection 550 from pawl 534, thus swinging the pawl 534 back to the position illustrated in FIG. 24, while the arm 532 remains in the position of FIG. 25.

Upon completion of the delivery of fuel oil, it is next necessary to close valve 508 before the final reading can be printed on the ticket. This results from the fact the plate 540 is in obstructive relation with arm 532 preventing full rotation of the shaft 530 and thus preventing rotation of the operating shaft 56 back to its start position. Once the valve 508 is closed and the bar 514 shifted back to the illustrated position, then of course the operating shaft 56 may be rotated back to its start position as the lever 532 is free to be swung to the position illustrated in FIG. 24. The printing unit is now ready for operation again once the type wheels have been reset to zero.

*Summary*

As a preliminary to the delivery of fuel oil, the knob 36 is rotated to adjust the variator to calculate the cost of the fuel oil at the established price per gallon. This price per gallon is also shown by the counter 38 at the front of the printer unit and likewise is set on the type wheels 30*p* (FIG. 3).

The cover 42 of the printer unit (FIG. 2) is raised and a ticket T (as seen in FIG. 26) is placed on the carrier 44. Presuming that the reset knob 54 has been rotated 360° to zero the type wheels 30, the operating lever 46 is swung from its illustrated start position to its delivery position, thereby printing a zero reading on the ticket T which would be the upper line of printing seen in FIG. 27.

At this point it will be noted that the ticket is compositely formed, comprising a relatively stiff card C of the type used in automatic business machines. Superposed on this card are alternate sheets or slips of thin paper and carbon paper as indicated by the legends in FIG. 27. By using such a ticket there is no need to ink the type wheels 30.

After the zero printing is made, the valve 508 is opened as the interlock elements, including lever 542 and pawl 534, are swung to the positions seen in FIG. 25 to permit shifting of the bar 514.

As fuel oil is delivered, rotation of the meter 510 (FIG. 28) is transmitted by shaft 34 (FIGS. 1 and 2) to the variator 32. The various drive connections of the variator 32 to the type wheels 30 (FIGS. 1–3) record the volume of cost of fuel oil, the amount of tax on the fuel oil, and the total cost of the fuel oil, including tax, on the type wheels 30*v*, 30*c*, 30*x* and 30*t*, respectively. The amount of fuel oil delivered is also shown by the counter 50 at the front of the printer unit. Counter 52 immediately thereabove indicates the cumulative amount of fuel delivered through the printer unit.

Upon completion of a delivery of fuel oil, the valve 508 must first be closed, thereby shifting the bar 514 (FIG. 24) back to its illustrated position. The operating shaft may now be swung back to its start position. As this occurs, a final reading is printed on the ticket T, the second line of printing seen in FIG. 27. The ticket is removed from the printer and once the reset knob 54 is rotated, the printer unit is ready for a subsequent delivery of fuel oil.

Having thus described the invention, what is claimed as novel and desired to be secured by Letters Patent of the United States is:

1. A ticket printer in combination with a variator driven in fixed relation to the delivery of measured quantities of liquid and having a volume output shaft reflecting the volume delivered and a money shaft reflecting the cost of the delivery and including variator adjusting means for the cost output shaft to reflect an established liquid unit price, said printer comprising a series of volume type-wheels, a series of cost type-wheels, a series of price type-wheels, a series of tax type-wheels, a shaft on which all type-wheels are rotatably mounted in side-by-side relation, a gear connected to and rotatable with each type-wheel, a second shaft parallel to the first shaft having a series of rotatably mounted idler gears meshing respectively with the type-wheel gears, a third shaft parallel to the second shaft having a series of rotatably mounted driving gears meshing respectively with said idler gears, spaced plates supporting said shafts, means to rotate the drive gear for the lowest order volume type-wheel from said volume output shaft, means for rotating the drive gear for the lowest order cost type-wheel from said money shaft, means for operating said variator adjusting means and simultaneously rotating the drive gear for the lowest order price type-wheel to indicate an established liquid unit price, means including a speed reducing drive for rotating the lowest order tax type-wheel from one of the variator output shafts and Geneva gear means to advance the remaining driving gears of each series in incremental steps, a one-way clutch connection between said third shaft and each of the driving gears for the volume, cost and tax type-wheels and one-way drive connections for operating said driving gears in one direction with means to rotate said third shaft and said driving gears in a reverse direction to reset said volume, cost and tax type-wheels to zero, interdigitating means normally locking said third shaft in a fixed angular position and means for axially shifting said third shaft to clear said interdigitating means and thereby permit rotation of said shaft in its said reverse direction, a comb comprising spring fingers engageable with the driving gears for the volume, cost and tax type-wheels, a comb holder pivotally mounted on said spaced plates to swing said fingers towards and away from said driving gears, a shaft rotatably carrying said Geneva gears and being slidably mounted in intersecting slots in said plates and said comb holder for movement towards and away from said driving gears, said Geneva shaft extending beyond one of said plates; cam means on said third shaft for displacing the said one end of the Geneva shaft away from the third shaft a distance sufficient for the comb holder to swing the comb teeth against said driving gears and sufficient to displace the Geneva gears out of mesh with the driving gears.

2. A printer and variator as in claim 1 wherein the Geneva gears are disposed above the drive gears and wherein a rod spans said Geneva gears and is positioned in vertical slots formed on said spaced plates above said Geneva gears and outwardly therefrom, said rod being positioned to mesh with said Geneva gears prior to their being fully disengaged from said driving gears.

3. A ticket printer and variator combination as in claim 1 wherein there is provided a carrier having means to support a ticket adjacent said type wheels, an operating shaft and a print arm connected thereto pivotable to press a ticket against the type wheels, an operating lever secured to the operating shaft for pivoting said operating shaft between a start and a delivery position, a casing enclosing the type wheels, the drive gears therefor and the carrier, said casing including a cover swingable to provide access to the carrier for insertion of a ticket therein, said operating lever in its start position being clear of said cover to permit insertion of a ticket, said operating lever in its delivery position being in obstructive position to swinging movement of said cover to prevent removal or insertion of a ticket while the operating lever is in its said delivery position.

References Cited in the file of this patent

UNITED STATES PATENTS

| | | |
|---|---|---|
| 1,461,455 | Reiss | July 10, 1923 |
| 2,117,653 | Clifton | May 17, 1938 |
| 2,160,032 | Ohmer | May 30, 1939 |
| 2,204,922 | Berck | June 18, 1940 |
| 2,328,435 | Eickmeyer | Aug. 31, 1943 |
| 2,378,532 | Bench | June 19, 1945 |
| 2,554,296 | Crews | May 22, 1951 |
| 2,604,040 | Fenstermaker | July 22, 1952 |
| 2,687,088 | Hennessy | Aug. 24, 1954 |
| 2,774,537 | Russell | Dec. 18, 1956 |
| 2,911,144 | Lee | Nov. 3, 1959 |
| 2,927,731 | Swarthout | Mar. 8, 1960 |
| 2,977,045 | Pandozy | Mar. 28, 1961 |
| 2,981,469 | Gelling | Apr. 25, 1961 |
| 3,014,657 | Sargent | Dec. 26, 1961 |
| 3,018,953 | Deutsch | Jan. 30, 1962 |
| 3,092,289 | Reutschler | June 4, 1963 |